United States Patent
Sarkar et al.

(10) Patent No.: US 10,648,862 B2
(45) Date of Patent: May 12, 2020

(54) COLOR SENSING AMBIENT LIGHT SENSOR CALIBRATION

(71) Applicant: MICROSOFT TECHNOLOGY LICENSING, LLC, Redmond, WA (US)

(72) Inventors: Abhijit Sarkar, Woodinville, WA (US); Samu Matias Kallio, Redmond, WA (US); Kari Jussi Ropo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 15/944,771

(22) Filed: Apr. 3, 2018

(65) Prior Publication Data

US 2019/0301932 A1    Oct. 3, 2019

(51) Int. Cl.
*G01J 3/02*     (2006.01)
*G01J 3/50*     (2006.01)
(Continued)

(52) U.S. Cl.
CPC ........... *G01J 3/0297* (2013.01); *G01J 1/0492* (2013.01); *G01J 1/42* (2013.01); *G01J 1/4204* (2013.01);
(Continued)

(58) Field of Classification Search
CPC ............. G01J 3/0297; G01J 3/465; G01J 3/50
See application file for complete search history.

(56) References Cited

U.S. PATENT DOCUMENTS 8,648,550 B2    2/2014   Staab
9,163,990 B2   10/2015   Lianza et al.
(Continued)

FOREIGN PATENT DOCUMENTS

EP       2526684       11/2012
WO    2011089094 A1    7/2011

OTHER PUBLICATIONS

"International Search Report and Written Opinion Issued in Patent Application No. PCT/US2019/016939", dated May 28, 2019, 12 Pages.
(Continued)

*Primary Examiner* — Jamil Ahmed
(74) *Attorney, Agent, or Firm* — NovoTechIP International PLLC

(57) ABSTRACT

Sensor calibration methods and systems can for providing accurate color values are disclosed. In one example, a method includes obtaining color measurements that indicate an amount of ambient light, as well as clustering the color measurements, and storing cluster parameters for the clustered color measurements. The method can further include automatic calculation of, for each cluster, generic transformation parameters for conversion of a color measurement to a calibrated color value. In another example, a method can include exposing a light sensor to a calibration ambient lighting, calculating sensor correction parameters for the light sensor, and storing the calculated parameters. As an additional example, an electronic device is adapted to determine calibrated color values with machine readable media storing cluster parameters, sensor correction parameters, and generic transform parameters used by the electronic device to calculate calibrated color values for ambient light sensor measurements.

17 Claims, 14 Drawing Sheets

(51) Int. Cl.
  *G01J 3/46* (2006.01)
  *G01J 1/42* (2006.01)
  *G01J 1/44* (2006.01)
  *G01J 3/52* (2006.01)
  *G01J 3/51* (2006.01)
  *G01J 1/04* (2006.01)

(52) U.S. Cl.
  CPC ............... *G01J 1/4228* (2013.01); *G01J 1/44* (2013.01); *G01J 3/465* (2013.01); *G01J 3/50* (2013.01); *G01J 3/505* (2013.01); *G01J 3/513* (2013.01); *G01J 3/524* (2013.01); *G01J 2001/444* (2013.01)

(56) References Cited

U.S. PATENT DOCUMENTS

| | | |
|---|---|---|
| 2005/0160092 A1 | 7/2005 | Mestha et al. |
| 2010/0085487 A1 | 4/2010 | Sarkar et al. |
| 2010/0163717 A1 | 7/2010 | Chang et al. |
| 2012/0001841 A1 | 1/2012 | Gokingco et al. |
| 2013/0033528 A1 | 2/2013 | Sarkar et al. |
| 2014/0044352 A1 | 2/2014 | Sarkar et al. |
| 2014/0247984 A1 | 9/2014 | Sarkar et al. |
| 2015/0092186 A1 | 4/2015 | Wieser et al. |
| 2015/0110400 A1* | 4/2015 | Vilpponen ........... H04N 5/2257 382/167 |
| 2015/0235348 A1 | 8/2015 | Sarkar et al. |
| 2016/0104284 A1 | 4/2016 | Maguire et al. |
| 2016/0217346 A1* | 7/2016 | Puetter ...................... G06T 5/50 |
| 2016/0232828 A1* | 8/2016 | Jia ......................... G09G 3/2003 |
| 2016/0370231 A1 | 12/2016 | Agahian et al. |
| 2017/0084250 A1 | 3/2017 | Jia et al. |
| 2017/0345352 A1 | 11/2017 | Hemminki et al. |

OTHER PUBLICATIONS

Azizyan, et al., "SurroundSense: Mobile Phone Localization via Ambience Fingerprinting", In Proceedings of the 15th Annual International Conference on Mobile Computing and Networking, Sep. 20, 2009, 12 Pages.

"International Search Report and Written Opinion Issued in Patent Application No. PCT/US2019/023796", dated May 28, 2019, 15 Pages.

* cited by examiner

COLOR SENSING AMBIENT LIGHT SENSOR CALIBRATION

BACKGROUND

Spectral sensitivities for various components or channels of a color sensing ambient light sensor do not often match those of the human visual system. As a result, additional mathematical steps in the form of sensor calibration are necessary to obtain accurate color coordinate value outputs. For example, a color conversion matrix can be used to convert color component values provided by the color sensing ambient light sensor into coordinates for standard color spaces (for example, CIE 1931 XYZ tristimulus values). However, the conversion matrix tends to differ widely based on the nature of a light source and its underlying spectral characteristics.

To develop a sensor calibration that provides accurate color values across a wide range of ambient lighting scenarios can involve collecting and processing many measurements obtained by exposing a color sensing ambient light sensor to many different ambient lighting scenarios. This can make robust and accurate sensor calibration a time-consuming process that is not ideal for implementing a per-sensor factory calibration for color sensing ambient light sensors and the electronic devices which incorporate them. Yet per-sensor calibration is very useful towards achieving color accuracy despite manufacturing variations in spectral response. There is a need for a per-sensor calibration process that is robust and accurate across a wide range of ambient lighting scenarios, while reducing the time required to characterize individual sensors to achieve a factory calibration process that is both accurate and efficient.

SUMMARY

A method of color sensing ambient light sensor calibration, in accord with a first aspect of this disclosure, includes obtaining a first plurality of color measurements produced by each of a first plurality of color sensing ambient light sensors for each of a plurality of ambient lighting scenarios, where each color measurement includes a plurality of color measurement components indicating an amount of ambient light measured by a respective one of a plurality of light detectors having substantially different spectral response profiles. The method also includes automatically clustering the first plurality of color measurements into a first plurality of lighting clusters based on the color measurement components included in the first plurality of color measurements, and storing cluster parameters effective for automatically identifying which of the first plurality of lighting clusters is associated with a color measurement obtained from a color sensing ambient light sensor. In addition, for each lighting cluster included in the first plurality of lighting clusters, the method includes automatically calculating a set of generic transformation parameters for automatically converting a color measurement obtained from a color sensing ambient light sensor to a corresponding calibrated color value based on a portion of the plurality of color measurements associated with the lighting cluster, and storing the set of generic transformation parameters in association with the lighting cluster.

A method for calibrating a color sensing ambient light sensor included in an electronic device, in accord with a second aspect, includes exposing the color sensing ambient light sensor to a first calibration ambient lighting corresponding to a first lighting cluster, and obtaining a first color measurement produced by the color sensing ambient light sensor in response to being exposed to the first calibration ambient lighting, where the first color measurement includes a plurality of color measurement components indicating an amount of light detected by a respective one of a plurality of light detectors having substantially different spectral response profiles. The method further includes calculating a first set of sensor correction parameters specific to the color sensing ambient light sensor based on a comparison between the first color measurement and a first reference color measurement associated with the first lighting cluster, and storing the first set of sensor correction parameters in association with the first lighting cluster in a machine-readable storage medium included in the electronic device.

In accord with another aspect of this disclosure, an electronic device adapted to determine calibrated color values for ambient lighting encountered by electronic device includes a color sensing ambient light sensor with a plurality of light detectors having substantially different spectral sensitivity profiles. The electronic device further includes one or more machine readable media in which are stored cluster parameters effective for automatically identifying which of a first plurality of lighting clusters is associated with a color measurement obtained for the color sensing ambient light sensor. The machine readable media also store one or more sets of sensor correction parameters, specific to the color sensing ambient light sensor and including a first set of sensor correction parameters for a first lighting cluster included in the first plurality of lighting clusters. In addition, the machine readable media stores a plurality of sets of generic transform parameters for automatically converting a color measurement obtained from a color sensing ambient light sensor into a corresponding calibrated color value, including a different set of generic transform parameters associated with each of the first plurality of lighting clusters. Furthermore, the machine readable media stores instructions which, when executed by the electronic device, cause the electronic device to receive a first color measurement from the color sensing ambient light sensor, and automatically identify, using the stored cluster parameters, which of the first plurality of lighting clusters is associated with the first color measurement. The machine readable media also stores instructions which, when executed by the electronic device, cause the electronic device to calculate a corrected color measurement by converting the first color measurement using one of the stored sets of sensor correction parameters, as well as select, from the plurality of sets of generic transformation parameters stored in the machine-readable storage medium, a first set of generic transformation parameters associated with the identified lighting cluster, and also to calculate a calibrated color value by converting the corrected color measurement using the selected first set of generic transformation parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

In FIGS. 5D and 5E, a multi-step clustering, involving first and second automated clusterings, is performed.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

Figure 1:
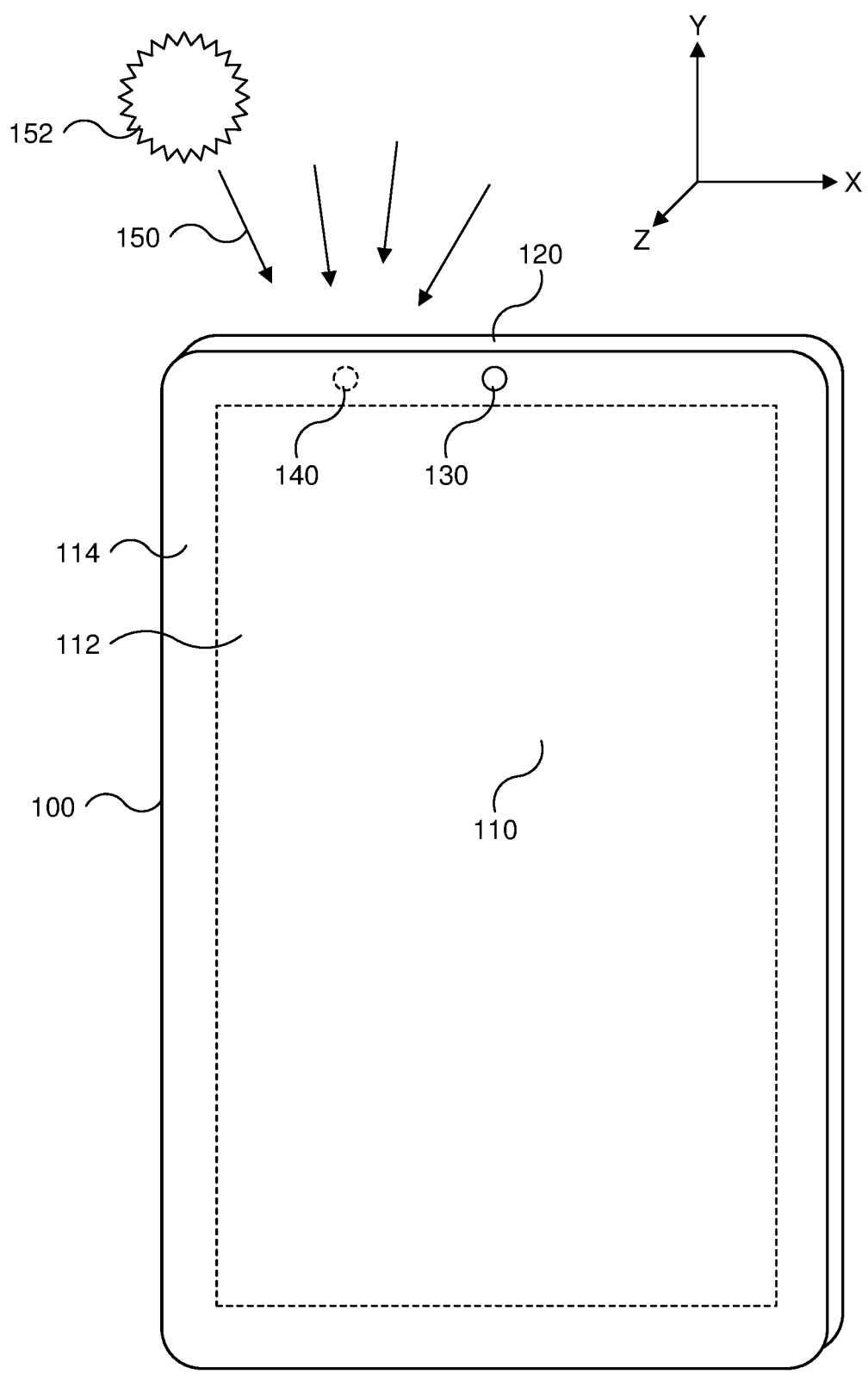
FIG. 1 illustrates an external view of an illustrative electronic device.

FIG. 1 illustrates an external view of an illustrative electronic device 100. In the particular example illustrated in FIG. 1, the electronic device 100 is embodied as a portable tablet computing device. Electronic device 100 may also be embodied as other computing devices such as, but not limited to, a laptop computer, a desktop computer and monitor, a smartphone, a media player, an image recorder (for example, a still image camera, video camera, or device including a still image and/or video camera), or other handheld or portable electronic device, a smaller device such as a wrist-watch device, a pendant device, a headphone or earpiece device, a device embedded in eyeglasses or other equipment worn on a user's head, or other wearable or miniature device, a television, a computer display, a gaming device, a navigation device, an embedded system such as a system in which electronic equipment with a display is mounted in a kiosk or automobile, equipment that implements the functionality of two or more of these devices, or other electronic equipment. The electronic device 100 may be more simply referred to as a device.

In the particular example illustrated in FIG. 1, the electronic device 100 includes a display device 110 (which may be referred to as a display) mounted in a housing 120 (which may be referred to as an enclosure or case). The display device 110 may be protected by a cover layer comprising materials such as, but not limited to, glass, plastic, or sapphire. One or more openings may be formed in the cover layer and/or the housing 120 to accommodate components such as, but not limited to, buttons, speakers, communications ports, and sensors. The display device 110 includes an array of pixel elements arranged to emit light through the cover layer to a user of the electronic device 100 in response to signal received from control circuitry included in the electronic device 100. The display device 100 may be implemented using liquid crystal display (LCD), organic light emitting diode (OLED), or other display technologies. The array of pixel elements defines an active area 112 used to display images.

In some embodiments, an inactive area 114 may run along one or more edges of the active area 112. The inactive area 114 may be referred to as a bezel. In FIG. 1, the inactive area 114 forms a border running fully around the active area 112. The inactive area 114 may contain circuits, signal lines, sensors, or other structures, some or all of which may be hidden from view of a user of the electronic device 100 with an opaque masking layer, such as a layer of black ink or paint on an underside of the cover layer. Optical components (for example, a camera, camera flash lighting, a light-based proximity sensor, a color sensing ambient light sensor (which may be referred to as a light sensor), and/or status indicator light-emitting elements) may be positioned under the inactive area 114. One or more openings (which may be referred to as windows or apertures) may be formed in the opaque masking layer to accommodate such optical components. In some implementations, the optical components may instead be positioned under the active area 112 and arranged to receive and/or transmit light through the display device 110. In such implementations, the electronic device 100 may not include the inactive area 114, and instead have the active area 112 occupy substantially all of the front surface of the electronic device 100, providing a front display surface without, or substantially without, a bezel.

In FIG. 1, a first opening 130 is provided in the inactive area 114 for a camera. The first opening 130 provides a substantially clear, non-opaque, region in the inactive layer 114 that minimizes a reduction in optical transmission to the camera, although also making the first opening 130 and the camera visible to a user of the electronic device 100. FIG. 1 also includes a second opening 140 provided for a color sensing ambient light sensor. In this example, an ink or other material, which may be different in material composition and/or structure than other opaque areas of the inactive area 114, is used for the second opening 140, which obscures the presence of the second opening 140 to a user of the electronic device 110. Although optical transmission is reduced through the second opening 140, there remains sufficient optical transmission at appropriate wavelengths for the color sensing ambient light sensor to receive and accurately measure ambient light 150 (for example, light emitted by a light source 152) through the second opening 140. The first opening 130 and/or the second opening 140 may each have a circular shape, a square shape, a shape with curved and/or straight edges, or any other suitable shape.

Figure 2:
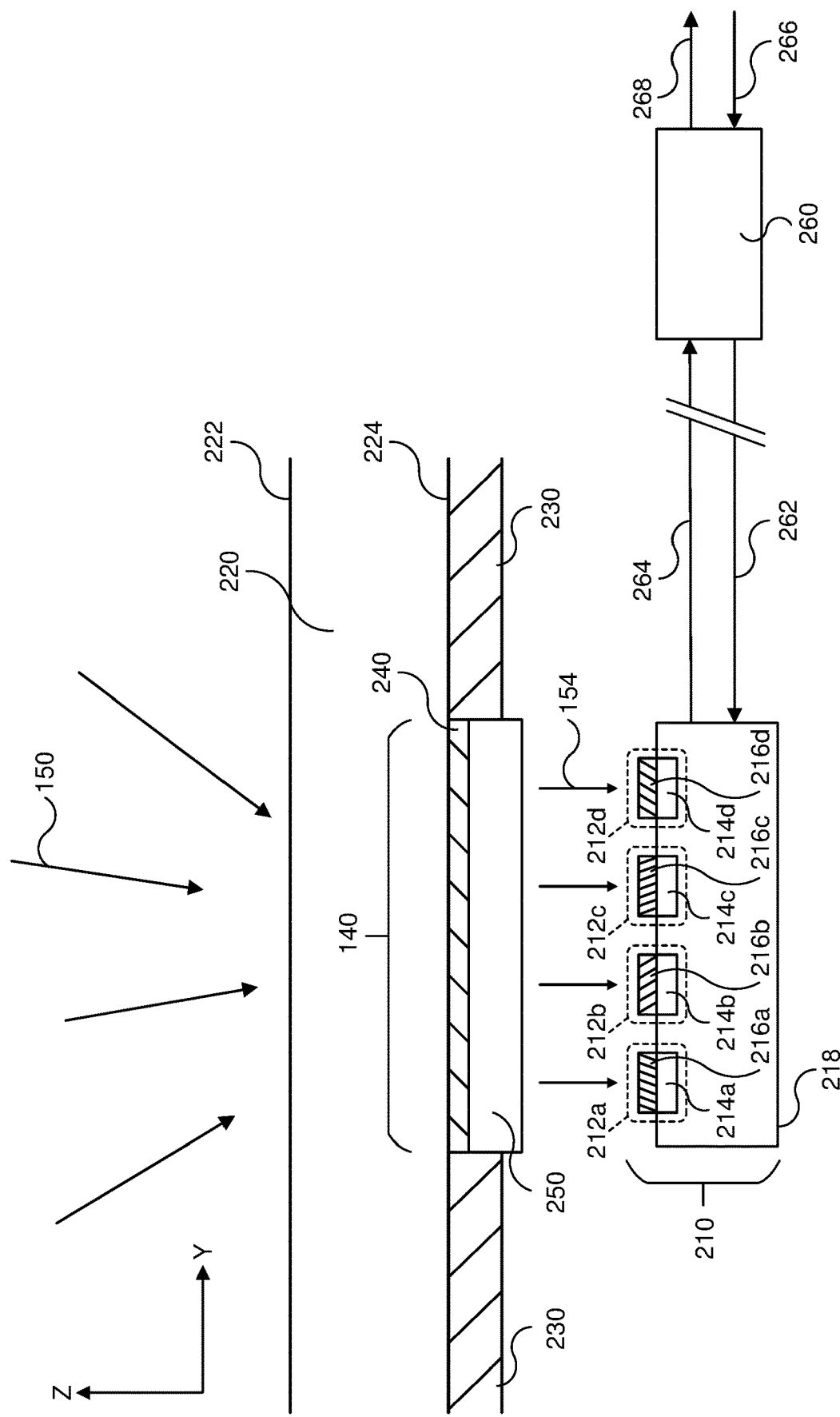
FIG. 2 is a cross-sectional view of a portion of the electronic device in FIG. 1 through an opening and a color sensing ambient light sensor arranged to receive ambient light through the opening.

FIG. 2 is a cross-sectional view of a portion of the electronic device 100 in FIG. 1 through the second opening 140 and a color sensing ambient light sensor 210 arranged to receive ambient light 150 through the second opening 140. As illustrated in FIG. 2, the color sensing ambient light sensor 210 may be mounted in alignment with the second opening 140. In the illustrated arrangement, the color sensing ambient light sensor 210 is used to measure and estimate various characteristics of ambient light 150 in the vicinity of the electronic device 100. As described in FIG. 1 and illustrated in FIG. 2, the electronic device 100 may include a cover layer 220 as an outermost layer. In some implementations, the cover layer 220, or a portion of the cover layer 220, is a multilayer structure. The cover layer 220 has an outer surface 222 and an inner surface 224.

The second opening 140 may be formed from an opening in opaque masking layer 230 on the inner surface 224. The opening in the opaque masking layer 230 associated with the second opening 140 may be filled with optical structures such as an ambient light sensor ink 240 and/or light redirecting structure 250. Ambient light sensor ink 240 may have sufficient optical transmission at appropriate wavelengths for the color sensing ambient light sensor 210 to receive and accurately measure ambient light 150, while at the same time enhancing the outward appearance of the second opening 140 (for example, by obscuring the presence of the second opening 140 to a user of the electronic device 100 by making the second opening 140 have a visual appearance that is similar to a portion of the cover layer 220 that includes the opaque masking layer 230). If desired, the ambient light sensor ink 240 may be omitted for the second opening 140.

The light redirecting structure 250 may be used to pass ambient light 150 gathered from various angles of incidence to the color sensing ambient light sensor 210. The light redirecting structure 250 may include structures such as diffusers, prisms, and/or patterned lenses to help redirect off-axis rays of ambient light 150 onto the color sensing ambient light sensor 210 at angles that are close to parallel to the Z axis (for example, ambient light ray 154), thereby reducing the dependence of ambient light measurements on a relative orientation between the electronic device 100 and the source(s) of ambient light 150. If desired, the light redirecting structure 250 may be omitted for the second opening 140.

The color sensing ambient light sensor 210 includes multiple light detectors 212a, 212b, 212c, and 212d, which may be collectively referred to as light detectors 212. The light detectors 212a, 212b, 212c, and 212d include respective photodetectors 214a, 214b, 214c, and 214d (for example, photodiodes, phototransistors, or other semiconductor photodetector structures). The light detectors 212 may be formed on a common semiconductor substrate such as substrate 216 or may be formed using two or more substrates. In some implementations, multiple openings, similar to the second opening 140, may be disposed at various positions and used for a color sensing ambient light sensor 210. Each of the light detectors 212a, 212b, 212c, and 212d may include a respective color filter 216a, 216b, 216c, and 216d. The color filters 216a, 216b, 216c, and 216d may be collectively referred to as color filters 216. The color filters 216 may be, for example, thin-film interference filters, colored layers of polymer, or other color filter elements (for example, colored filters formed using dyes and/or pigments) formed on or otherwise positioned above photodetectors 214. The light detectors 212 have substantially different spectral responses to received light, which may be due to, at least in part, substantially different spectral transmission characteristics for the color filters 216. Each light detector 212 provides an indication of an amount or intensity of received ambient light according to its spectral response. Although in the example illustrated in FIG. 2 the color sensing ambient light sensor 210 includes four light detectors 212a, 212b, 212c, and 212d, in other examples the color sensing ambient light sensor 210 may include three light detectors 212 or more than four light detectors 212, with corresponding adjustments to the techniques described herein for use and operation of the color sensing ambient light sensor 210.

The color sensing ambient light sensor 210 receives and responds to control signals 262 received from control circuitry 260 included in the electronic device 100. The control circuitry 260 is not illustrated in cross-section in FIG. 2, but instead is illustrated schematically. The color sensing ambient light sensor 210 generates and outputs sensor signals 264 indicating, among other things, amounts of light measured by the light detectors 212, which is received by the control circuitry 260. The control circuitry 260 also receives input signals 266 from other elements of the electronic device 100. In response to the sensor signals 264 and/or the input signals 266, the control circuitry generates output signals 268, which are provided to and affect the operation of other elements included in the electronic device 100. For example, the control circuitry 260 may be configured to, in response to the sensor signals 264 and input signals 266 providing image data intended for display via the display device 110, adjust a color cast of the image data (often referred to as the white point) and provide corresponding output signals 268 to the display device 110.

Figure 3A:
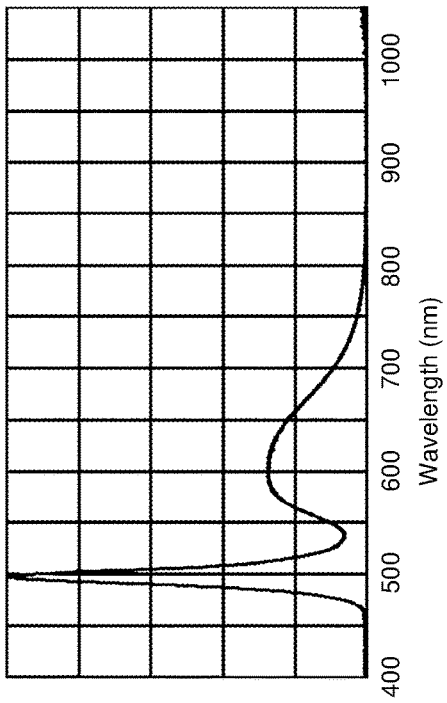
FIGS. 3A-3D illustrate examples of spectral emission profiles for various types of light sources.
Figure 3B:
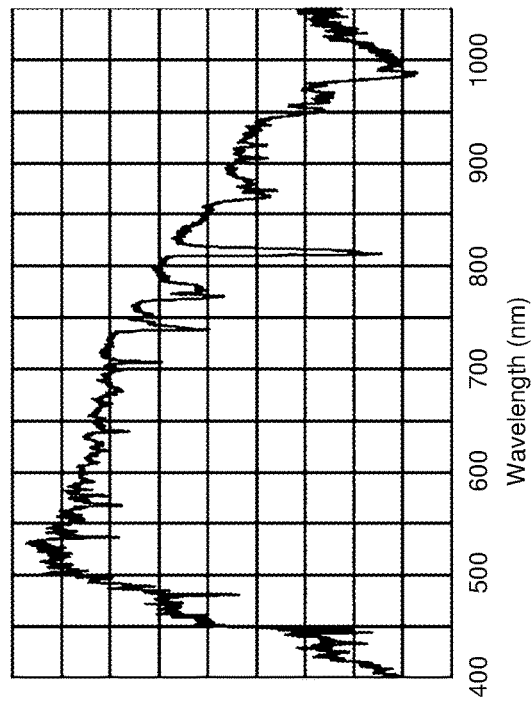
Figure 3C:
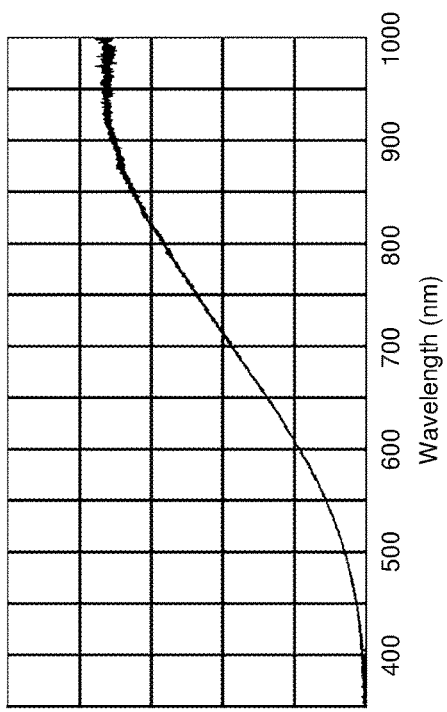
Figure 3D:
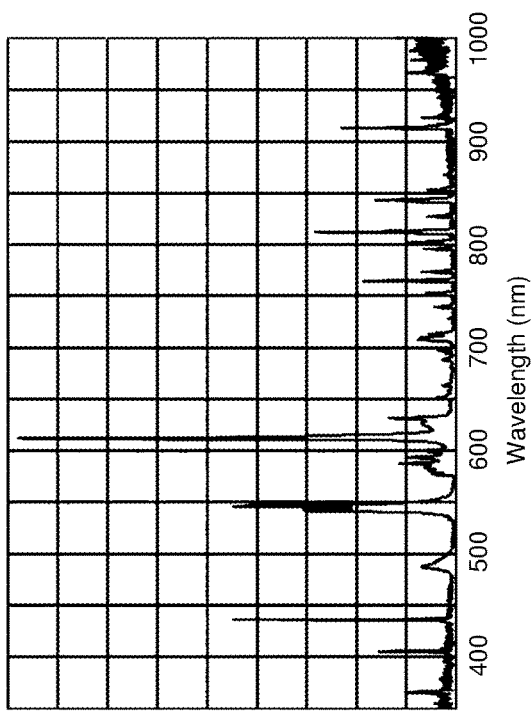

FIGS. 3A-3D illustrate examples of spectral emission profiles for various types of light sources. FIG. 3A illustrates a spectral emission profile for an example halogen bulb based light source. FIG. 3B illustrates a spectral emission profile for an example white light emitting diode (LED) based light source. FIG. 3C illustrates a spectral emission profile for an example fluorescent light based light source. FIG. 3D illustrates a spectral emission profile for sunlight. As can be seen from the examples in FIGS. 3A-3D, spectral emission profiles may vary widely across various light sources. Even where two light sources are determined to have a similar color temperature, they may have very different spectral emission profiles. For example, a halogen bulb with 3000K color temperature has a significantly different spectral emission profile from a 3000K warm white LED lamp and a 3000K warm white compact fluorescent light (CFL). This introduces challenges in accurately estimating color chromaticities for different ambient lighting circumstances based on measurements obtained using the light detectors 212 included in the color sensing ambient light sensor 210.

Figure 3E:
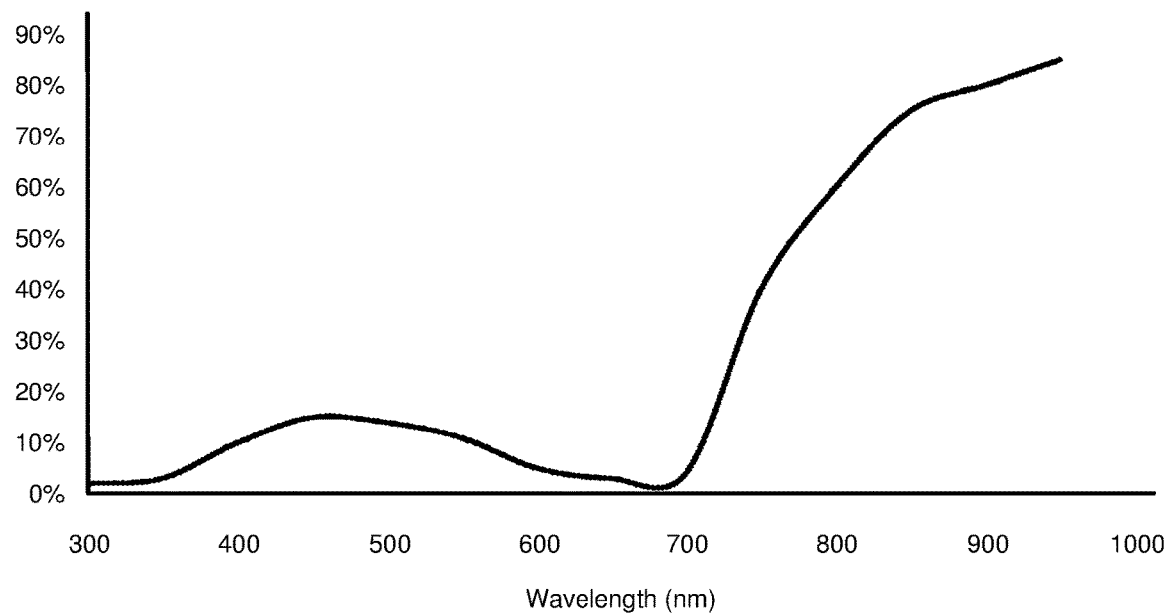
FIG. 3E illustrates an example of a spectral transmission profile for an ambient light sensor ink.

FIG. 3E illustrates an example of a spectral transmission profile for an ambient light sensor ink, such as the ambient light sensor ink 240. As seen in FIG. 3E, there is very low transmission of visible light through the ambient light sensor ink, while there is an increasing and significantly greater transmission of infrared (IR) wavelengths. The color sensing ambient light sensor 210 is configured to perform measurements of light received through the ambient light sensor ink that, across a wide range of lighting intensities, allows accurate color estimation to be performed.

Figure 3F:
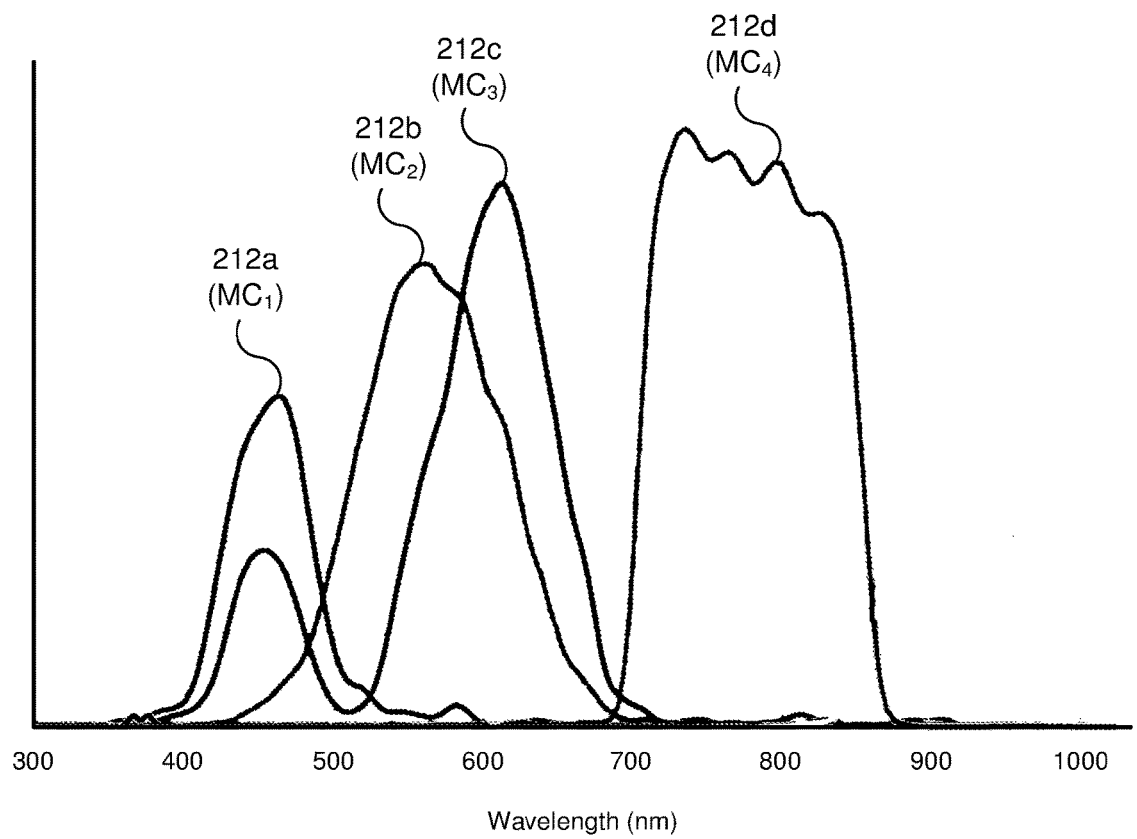
FIG. 3F illustrates an example of spectral response curves for the four light detectors included in the color sensing ambient light detector in FIG. 2.

FIG. 3F illustrates an example of spectral response profiles for the four light detectors 212a, 212b, 212c, and 212d included in the color sensing ambient light detector 210 in FIG. 2. The light detectors 212 have substantially different responses to received light intensity at various wavelengths, which may be due to, at least in part, substantially different spectral transmission profiles for the color filters 216. The light detector 212a (providing a color measurement component labeled "$MC_1$") is most responsive to blue wavelengths. The light detector 212b (providing a color measurement component labeled "$MC_2$") is most responsive to green and yellow wavelengths, and has an overlapping spectral response with the light detector 212a. The light detector 212c (providing a color measurement component labeled "$MC_3$") is most responsive to red and orange wavelengths, and has an overlapping spectral response with the light detectors 212a and 212b. The light detector 212d (providing a color measurement component labeled "$MC_4$") is most responsive to infrared wavelengths. It is noted that the term "color measurement component" is not limited to a value directly reported by an ambient light sensor, but also a derived indication of measured light intensity; for example, offset, scaling, or other transformations of an initial value received from an ambient light sensor that provides an indication of measured light intensity. This also includes, for example, an average of values obtained from multiple measurements. For purposes of this discussion, the term "average" includes, but is not limited to, an arithmetic mean (for which there are various algorithms), a median, or a mode.

The ambient light 150 measured by each of the light detectors 212 passes through an "optical stack" of materials: the cover layer 220, optical ink 240, light redirecting structure 250, and color filters 216, each of which may be affected by manufacturing variations resulting in individual variations in spectral transmission to the light detectors 212 for each installed color sensing ambient light sensor 210 through its respective optical stack. In addition, manufacturing variations may also affect active semiconductor elements of the color sensing ambient light sensor 210 (for example, light detectors 212 and/or analog to digital converters (ADCs)), resulting in variations in spectral sensitivity, gain, and/or offset. A sensor specific calibration is useful for improving the accuracy of color values despite such variations in performance.

Figure 4:
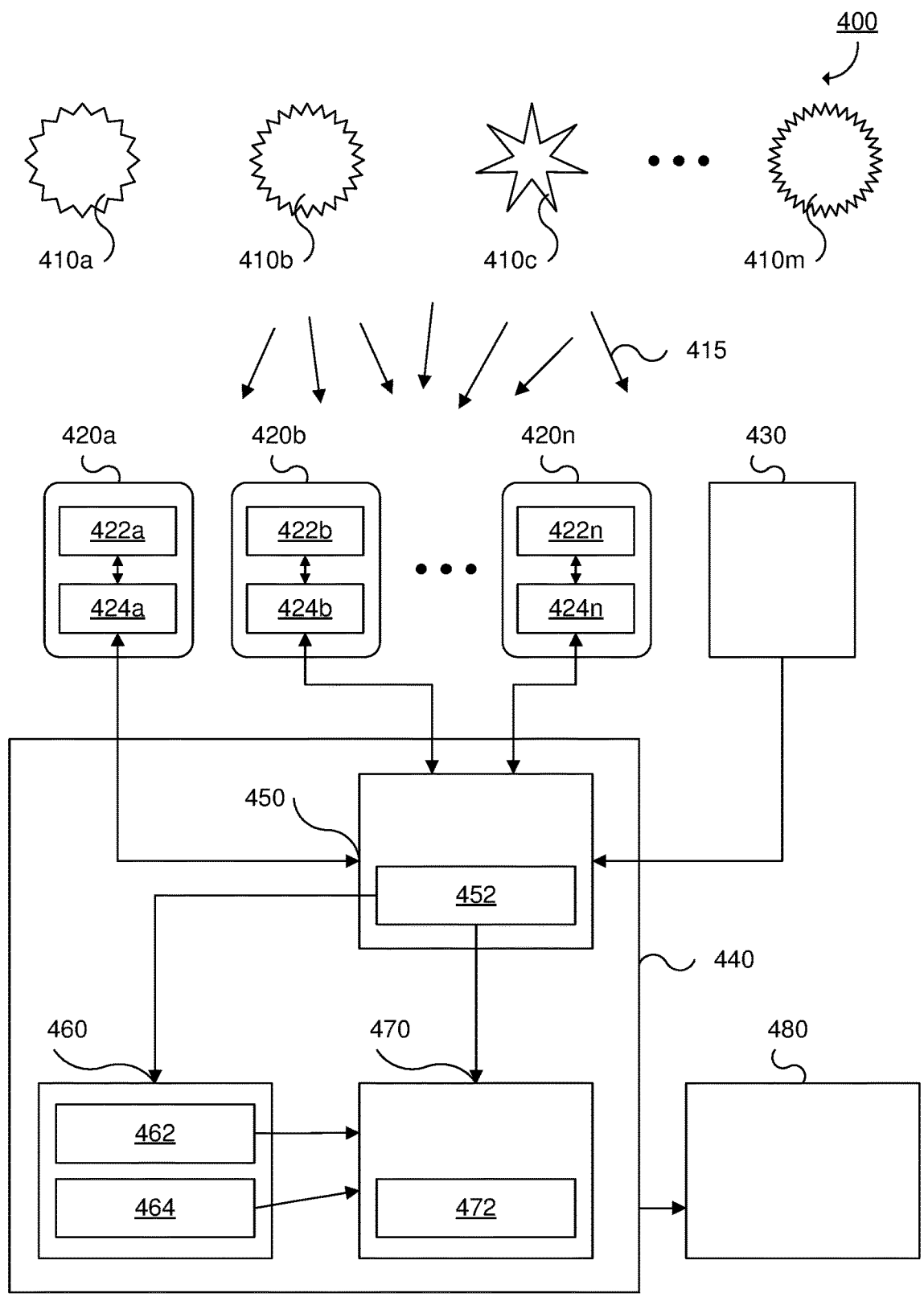
FIG. 4 illustrates an example of an ambient lighting characterization system adapted to characterize responses of color sensing ambient light sensors to various ambient lighting scenarios.

FIG. 4 illustrates an example of an ambient lighting characterization system 400 (which may be referred to as characterization system 400) adapted to characterize responses of color sensing ambient light sensors to various ambient lighting scenarios. The characterization system 400 includes a plurality of lighting sources 410a-410m (which may be collectively referred to as lighting sources 410) providing various spectral emission profiles such as, but not limited to, the spectral emission profiles illustrated in FIGS. 3A-3D. A lighting source refers to one or more light emitting components, which may each include multiple discrete light emitting elements, with substantially similar spectral emission profiles. Additionally, the lighting sources 410 may exhibit a range of color temperatures and lighting technologies (such as, but not limited to, incandescent, halogen, fluorescent, CFL, and LED). Each of the lighting sources 410 is configured to be selectively enabled or disabled to provide ambient light 415, and combinations of the lighting sources 410 may be enabled concurrently to produce ambient light 415 presenting mixed lighting conditions. In some examples, a portion of the lighting sources 410 are configured to perform dimming to a selected degree. Selective enabling/disabling and/or dimming of the lighting sources 410 may be performed under control of a measurement collection module 450, which is described in further detail below.

The characterization system 400 includes a plurality of reference sensor devices 420a-420n (which may be collectively referred to as reference sensor devices 420 or reference devices 422) including a respective color sensing ambient light sensor 422a-422n (which may be collectively referred to as color sensing ambient light sensors 422 or reference sensors 422), which may include the various features described for the color sensing ambient light sensor 210 in FIG. 2. Each of the reference sensor devices 420a-420n also includes a respective measurement control module 424a-424n configured to receive commands from the measurement collection module 450, control a respective color sensing ambient light sensor 422a-422n according to the received commands (including, for example, setting operating parameters and/or initiating measurement operations), obtain sensor signals from the respective color sensing ambient light sensor 422a-422n, and provide the sensor signals to the measurement collection module 450. The reference sensor devices 420 are constructed with an optical stack as described in FIG. 2, with the optical stack and color sensing ambient light sensors 422 being representative of those used in electronic devices used by end users, such as the electronic device 100 described in FIGS. 1 and 2. However, the reference sensor devices 420 may be prototype or incomplete devices not including all of the components or features provided in end user electronic devices.

The characterization system 400 may also include a reference spectrometer 430 used to perform accurate color measurements of ambient light 415. For example, the reference spectrometer 430 may be configured to provide color measurements as CIE 1931 XYZ tristimulus values. The measurement collector 450 may be configured to automatically receive color measurements of ambient light 415 from the reference spectrometer 430.

The characterization system 400 includes a sensor analysis system 440, which includes the measurement collection module 450. The measurement collection module 450 is configured to collect color measurements from each of the reference sensor devices 420 for each of a plurality of selected ambient lighting scenarios presenting different spectral emission profiles. As mentioned previously, in some implementations the measurement collection module 450 is configured to automatically control and configure the lighting sources 410 to selectively enabling/disabling and/or dimming individual lighting sources 410 to present each of the plurality of ambient lighting scenarios. In some examples, the measurement collection module 450 is configured to automatically control and configure dimming of individual lighting sources 410 to present ambient lighting scenarios with various illuminances. Each different illuminance used for an ambient lighting scenario with a given color temperature may be referred to as an ambient lighting condition. In some examples in which the measurement collection module 450 receives color measurements of ambient light 415 from the reference spectrometer 430, the measurement collection module 450 may be configured to control dimming of one or more lighting sources 410; for example, to achieve a selected illuminance. Additionally, in some examples one or more of the plurality of ambient lighting scenarios is achieved with two or more of the lighting sources 410 concurrently enabled, to present and obtain measurements for mixed lighting conditions, as such mixed lighting conditions may be encountered by end users.

The measurement collection module 450 collects one or more color measurements from each of the reference sensor devices 420 for each of the plurality of selected ambient lighting scenarios at one or more selected illuminances. In some examples, for each selected ambient lighting condition, multiple color measurements may be obtained from a reference sensor device 420, with the reference sensor device 420 positioned in a different orientation for each color measurement, in order to also measure and characterize off-axis responses of the reference sensor devices 420. The measurement collection module 450 is also configured to collect color measurements from the reference spectrometer 430 for each selected ambient lighting condition. The measurement collection module 450 is configured to store the color measurements obtained from the reference sensor devices 420 and the reference spectrometer 430, as well as provide the stored color measurements 452 in response to requests from other modules and/or systems. In some examples, each reference sensor device 420 is configured to use a same predetermined gain level and/or a predetermined integration time for collecting color measurements.

Figure 5A:
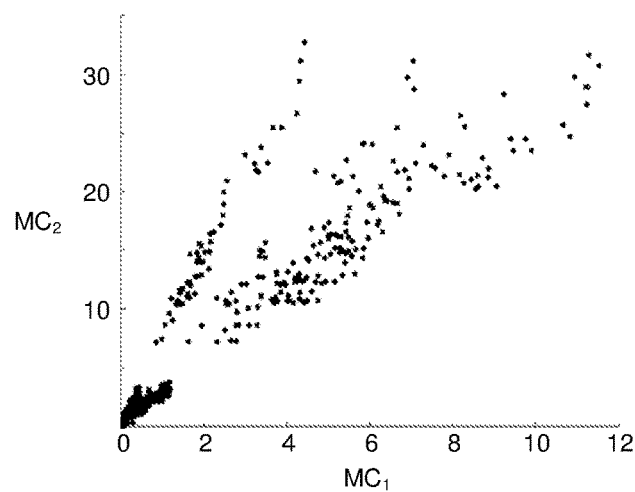
FIGS. 5A-5C illustrate an example of color measurements collected by the measurement collection module in FIG. 4.
Figure 5B:
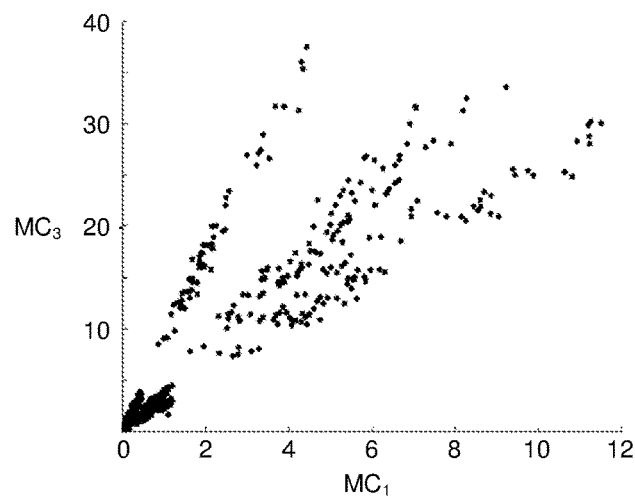
Figure 5C:
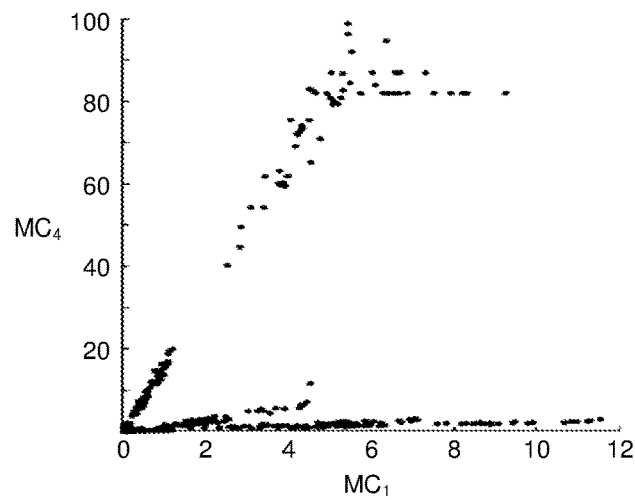

FIGS. 5A-5C illustrate an example of color measurements collected by the measurement collection module 450 in FIG. 4. In this example, color measurements were collected for eight lighting scenarios, each using one of eight light sources 410: a 40 W halogen light, a 45 W incandescent light, a 2700K "warm white" CFL, a 4100K "natural white" fluorescent light, a 6500K "daylight" fluorescent light, a 3000K "warm white" LED, a 5000K "cold white" LED, and a 6500K "daylight" LED. Each of the eight light sources 410 were operated, with only one light source 410 enabled at a time, at four different illuminances: about 500 lux, about 1000 lux, about 5000 lux, and about 7000-10000 lux (with some light sources having a maximum illuminance below 10000 lux). Thus, a total of 32 different ambient lighting conditions were used for collecting color measurements for the eight ambient lighting scenarios. Color measurements were collected from 14 reference sensor devices 420 for each of the 32 ambient lighting conditions, yielding 448 color measurements. For each color measurement, a four-dimensional color measurement was obtained that included the $MC_1$, $MC_2$, $MC_3$, and $MC_4$ color measurement components described in FIG. 3F. The color measurement components for these color measurements are plotted in FIGS. 5A-5C along various axes: in FIG. 5A, $MC_2$ values are shown in relation to $MC_1$ values; in FIG. 5B, $MC_3$ values are shown in relation to $MC_1$ values; and in FIG. 5C, $MC_4$ values are shown in relation to $MC_1$ values.

Returning to the discussion of FIG. 4, the characterization system 400 includes an ambient lighting clustering module 460 that is configured to automatically analyze the stored color measurements 452 to identify a plurality of clusters of color measurements (which may be referred to as ambient lighting clusters or lighting clusters). Various techniques are known and may be applied for performing automated clustering, including, but not limited to k-means, Gaussian mixture model, k-medoid/PAM clustering, or unsupervised training techniques and algorithms, and variations thereof. In some examples, rather than only selecting from the color measurement components provided by the color sensing ambient light sensors 422 as dimensions for color measurement coordinates used to identify lighting clusters, one or more ratios are calculated using the color measurement component that is the most responsive to the shortest visible wavelengths ($MC_1$ in the examples illustrated in FIGS. 2 and 3F) as the dividend for the ratios, and the one or more ratios are included as dimensions for color measurement coordinates used to identify lighting clusters. In the examples illustrated in FIGS. 2 and 3F, with four measurement components $MC_1$, $MC_2$, $MC_3$, and $MC_4$, three candidate ratios are available: $MC_2/MC_1$, $MC_3/MC_1$, and $MC_4/MC_1$. In some examples, other arithmetic combinations of the color measurement components may be used as dimensions for color measurement coordinates used to identify lighting clusters. In some examples, a multi-step clustering may be performed, in which a first clustering based on a first set of dimensions identifies first and second lighting clusters for the stored color measurements 452, and a second clustering based on a different second set of dimensions identifies third and fourth lighting clusters for the stored color measurements 452 included in the second cluster. Such multi-step clustering may result in lighting clusters giving more accurate estimated color values. Various techniques are known, and may be applied, to determine an effective number of clusters that does not overfit the stored color measurements 452; for example, silhouette analysis may be used with k-means to evaluate and/or compare clusters produced for selected numbers of clusters. The ambient lighting clustering module 460 is configured to store cluster parameters for the identified lighting clusters, as well as provide the stored cluster parameters 462 in response to requests from other modules and/or systems. As an example, a cluster centroid may be stored as cluster parameters for a cluster identified using k-means clustering. The stored cluster parameters are effective for automatically identifying one of the identified lighting clusters as being associated with a color measurement, such as a new color measurement not originally used to identify the lighting clusters.

In some implementations, each of the ambient lighting scenarios (for example, an ambient lighting scenario in which a single lighting source 410 is enabled) is associated with a lighting cluster, resulting in each lighting cluster being associated with a lighting group of one or more of the ambient lighting scenarios. In some examples, an ambient lighting scenario is associated with the lighting cluster containing the greatest number of stored color measurements 452 for the ambient lighting scenario. In some examples, where the stored color measurements 452 for an ambient lighting scenario are across multiple lighting clusters, a stored color measurement 452 may be removed from a first lighting cluster and/or added to a second lighting cluster (for example, where the second cluster initially contains the greatest number of the stored color measurements 452 for the ambient lighting scenario). In response to a stored color measurement 452 being added to or removed from a lighting cluster, cluster parameters (including stored cluster parameters 462) for the lighting cluster may be accordingly updated; for example, a cluster centroid may be recalculated. The ambient lighting clustering module 460 may be configured to store the determined lighting groups, as well as provide the stored lighting groups 464 in response to requests from other modules and/or systems.

Figure 5D:
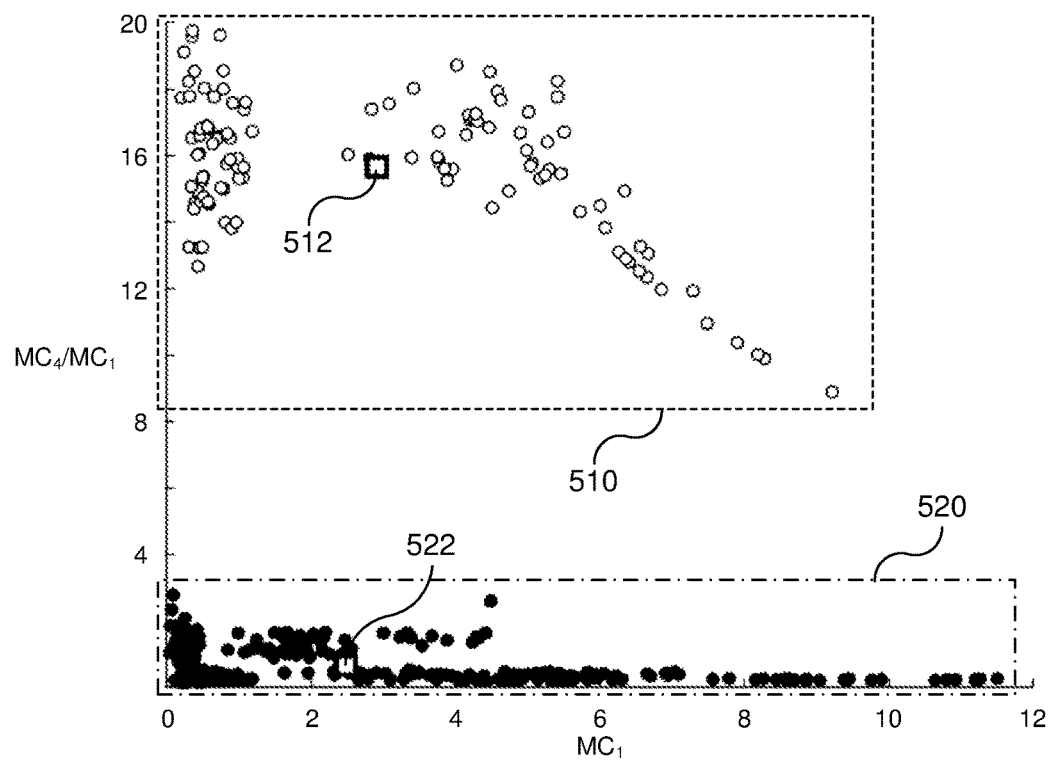
FIGS. 5D and 5E illustrate results of an automated clustering of the color measurements described and illustrated in FIGS. 5A-5C, in accordance with clustering techniques described herein.
Figure 5E:
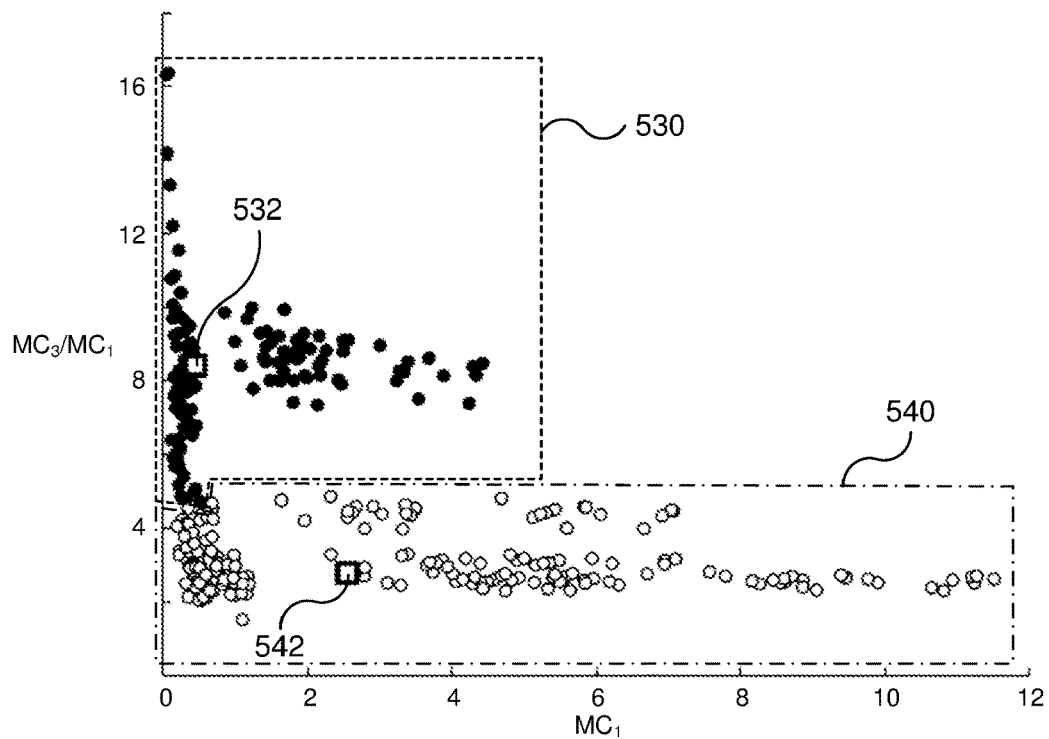

FIGS. 5D and 5E illustrate results of an automated clustering of the color measurements described and illustrated in FIGS. 5A-5C, in accordance with the clustering techniques described above. In FIGS. 5D and 5E, a multistep clustering, involving first and second automated clusterings, is performed. FIG. 5D illustrates a result of the first automated clustering where for each color measurement, a ratio of the $MC_4$ and $MC_1$ color measurement components (labeled "$MC_4/MC_1$") and the $MC_1$ color measurement component are used as the dimensions for clustering. In this example, the first automated clustering is performed using a k-means clustering algorithm dividing the measurement data into two lighting clusters: a first lighting cluster 510 with a first cluster centroid 512 and a second lighting cluster 520 with a second cluster centroid 522. FIG. 5E illustrates a result of the second automated clustering where for each color measurement in the second lighting cluster 520 (and not including color measurements in the first lighting cluster 510), a ratio of the $MC_3$ and $MC_1$ color measurement components (labeled "$MC_3/MC_1$") and the $MC_1$ color measurement component are used as the dimensions for clustering. In this example, the second automated clustering was performed using a k-means clustering algorithm whereby the color measurements in the second lighting cluster 520 were divided into two lighting clusters (which may also be referred to as subclusters): a third lighting cluster 530 with a third cluster centroid 532 and a fourth lighting cluster 540 with a fourth cluster centroid 542. The first lighting cluster 510 corresponds to a first lighting group (including the 40 W halogen light and the 45 W incandescent light ambient lighting scenarios), the third lighting cluster 530 corresponds to a second lighting group (including the "warm white" CFL and the 2700K "warm white" CFL ambient lighting scenarios), and the fourth lighting cluster corresponds to a third lighting group (including the "natural white" fluorescent light, the "daylight" fluorescent light, the "cold white" LED, and the "daylight" LED ambient lighting scenarios). Each of the clusters 510, 520, 530, and 540 may be represented by its respective centroid 512, 522, 532, and 542. In this example, the $MC_2$ color measurement component is not used, even for generating a ratio, to identify lighting clusters for color measurements, although the $MC_2$ color measurement component is used to calculate estimated calibrated color values.

Returning to the discussion of FIG. 4, the characterization system 400 includes a lighting group transformation generator 470 configured to calculate, for each lighting cluster and/or lighting group identified by the ambient lighting clustering module 460, a respective set of generic transformation parameters for a transformation function from color measurement components obtained from a color sensing ambient light sensor to a calibrated color value. The transformation parameters are "generic" due to the parameters not accounting for sensor-specific variations in performance. However, the generic transformation parameters are generally effective for providing calibrated color values for the reference sensors 422 and similar color sensing ambient light sensors, such as the color sensing ambient light sensor 210 in FIG. 2. The lighting group transformation generator 470 is be configured to store the per-cluster sets of generic transformation parameters, as well as provide the stored sets of generic transformation parameters 472 in response to requests from other modules and/or systems.

In some implementations, the transformation parameters are coefficients for calculating calibrated color components as linear combinations of the color measurement components. For such a transformation, the four measurement components $MC_1$, $MC_2$, $MC_3$, and $MC_4$ of a color measurement may be arranged in a column as a 4×1 matrix M, the transformation parameters arranged in a 3×4 generic parameter matrix $P_{cluster}$, and the matrices M and $P_{cluster}$ multiplied to yield the calibrated color value (for example, as CIE 1931 XYZ tristimulus values) in a column as a 3×1 matrix $C_{calib}$, according to equation 1.

$$C_{calib} = P_{cluster} \cdot M \qquad (1)$$

Various approaches may be used to calculate the generic parameter matrix $P_{cluster}$ for a lighting cluster. In a first approach, for each ambient lighting scenario included in the lighting group associated with the lighting cluster, a corresponding lighting scenario parameter matrix $P_{scenario}$, having the same dimensions as the above parameter matrix $P_{cluster}$ (3×4, in this example) is calculated, which can be applied in the same manner as the parameter matrix $P_{cluster}$ to produce calibrated color values from color measurement component values. The lighting scenario parameter matrix $P_{scenario}$ may be calculated according to equation 2.

$$P_{scenario} = C_{ref} \cdot M_{scenario}^{+} \qquad (2)$$

$C_{ref}$ is a 3×k matrix, where k is the number of stored color measurements 752 for the ambient lighting scenario and the columns of $C_{ref}$ contain the tristimulus values provided by the reference spectrometer 430 for the ambient lighting conditions for each of the k stored color measurements 762 for the ambient lighting scenario. $M_{scenario}^{+}$ is a k×4 pseudoinverse matrix (for example, a Moore-Penrose pseudoinverse), or a similar matrix, of a 4×k matrix $M_{scenario}$, in which the columns of $M_{scenario}$ contain the four color measurement components $MC_1$, $MC_2$, $MC_3$, and $MC_4$ of the k stored color measurements 752 for the ambient lighting scenario. The pseudoinverse provides the best linear approximation, in terms of least squares error, to the actual solution. In some examples, the generation of $M_{scenario}$, $M_{scenario}^{+}$, and/or $P_{scenario}$ may apply weightings to various color measurements to better reflect their expected importance. In some implementations, k is instead the number of stored color measurements 452 for the ambient lighting scenario at a reference illuminance used for all of the ambient lighting scenarios (for example, 5000 lux), and the columns of $C_{ref}$ and $M_{scenario}$ correspond to those stored color measurements 452. The lighting group transformation generator 470 may be configured to store the lighting scenario parameter matrix $P_{scenario}$ calculated for each of ambient lighting scenario. Where the lighting cluster has only one ambient lighting scenario in its associated lighting group, the generic parameter matrix $P_{cluster}$ for the lighting cluster is simply the lighting scenario parameter matrix $P_{scenario}$. Where the lighting cluster has two or more ambient lighting scenarios in its associated lighting group, the generic parameter matrix $P_{cluster}$ for the lighting cluster may be calculated by a mathematic combination of the lighting scenario parameter matrices $P_{scenario}$ calculated for each of the ambient lighting scenarios. For example, each element of the generic parameter matrix $P_{cluster}$ may be calculated by taking the median of the corresponding elements in the lighting scenario parameter matrices $P_{scenario}$. In some examples, the mathematic combination may apply weightings to various ambient lighting scenarios to better reflect their expected importance in end usage situations.

In a second approach, similar operations are performed, but the generic parameter matrix $P_{cluster}$ is calculated more directly according to equation 3.

$$P_{cluster} = C_{ref} \cdot M_{cluster}^{+} \qquad (3)$$

$C_{ref}$ is a 3×j matrix, where j is the number of stored color measurements 452 for the lighting cluster and the columns of $C_{ref}$ contain the tristimulus values provided by the reference spectrometer 430 for the ambient lighting conditions for each of the j stored color measurements 452 for the lighting cluster. $M_{cluster}$ is a j×4 pseudoinverse matrix, or a similar matrix, of a 4×j matrix $M_{cluster}$, in which the columns of $M_{cluster}$ contain the four color measurement components $MC_1$, $MC_2$, $MC_3$, and $MC_4$ of the j stored color measurements 452 for the lighting cluster. In some implementations, j is instead the number of stored color measurements 452 for the lighting cluster at a reference illuminance (for example, 5000 lux) used for all of the ambient lighting scenarios associated with the lighting cluster, and the columns of $C_{ref}$ and $M_{cluster}$ correspond to those stored color measurements 452. In some examples, the generation of $M_{cluster}$, $M_{cluster}^+$, and/or $P_{cluster}$ may apply weightings to various color measurements to better reflect their expected importance in end usage situations.

It is noted that the transformation function is not limited to the above linear combinations. The transformation function may include one or more of a lookup table (with or without interpolation), an algorithm trained with unsupervised training techniques, and a function that is responsive to one or more past color measurements and/or calibrated color values.

In some implementations, the characterization system 400 is configured to automatically perform an iterative process in which the ambient lighting clustering module 460 automatically identifies a selected number of lighting clusters, the lighting group transformation generator 470 calculates a set of generic transformation parameters for each of the identified lighting clusters, the sets of generic transformation parameters are applied to associated stored color measurements 452 to estimate calibrated color values, and an error calculated (for example, a mean squared error) between the estimated calibrated color values and corresponding color values obtained from the reference spectrometer 430. An appropriate number of lighting clusters may be identified by a number of lighting clusters after which a rate of reduction in the error decreases significantly.

FIG. 4 also illustrates an external system 480 that is configured to obtain various measurement-, cluster-, and transformation parameter-related information from characterization system 440 for use by the external system 480. For example, the external system 480 may obtain stored color measurements 452, stored cluster parameters 462, stored lighting groups 464, and/or stored sets of generic transformation parameters 472 from characterization system 440.

Figure 6:
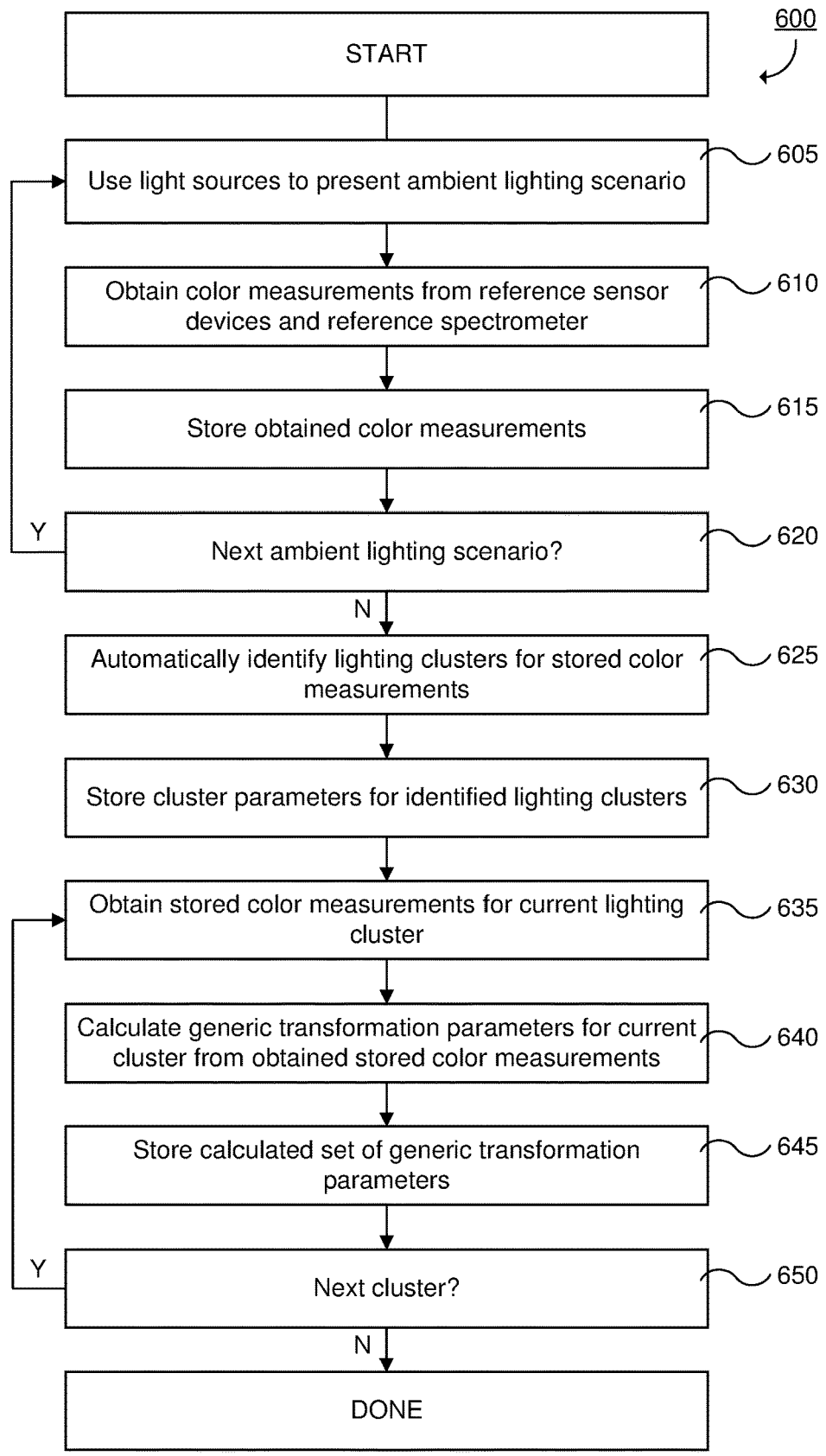
FIG. 6 illustrates an example process for use of the characterization system in FIG. 4.

FIG. 6 illustrates an example process 600 for use of the characterization system 400 in FIG. 4, applying the various techniques described above. It is noted that other processes, or variations of the process 600, may instead be applied. At 605, one or more light sources 410 are used to present a current ambient lighting scenario to the reference sensor devices 420. At 610, color measurements are obtained from each of the reference sensor devices 420 while exposed to the current ambient lighting scenario and, in some examples, also a calibrated color value is obtained from a reference spectrometer 430 while also exposed to the current ambient lighting scenario. This may be performed with the current ambient lighting scenario being presented at different illuminances and corresponding color measurements also obtained. At 615, the obtained color measurements are stored for later processing. At 620, if there is another ambient lighting scenario for which color measurements are to be obtained, steps 605-615 are repeated for the next ambient lighting scenario.

At 625, the characterization system 400 automatically identifies lighting clusters for the stored color measurements. At 630, the characterization system 400 stores cluster parameters for the identified lighting clusters for later use. At 635, stored color measurements are obtained for a current lighting cluster. This may selectively exclude some of the color measurements stored for the lighting cluster, such as color measurements obtained from reference sensor devices 420 determined to be outliers. At 640, the characterization system 400 calculates a set of generic transformation parameters for the current lighting cluster based on the color measurements obtained at 635. At 640, the calculated set of transformation parameters are stored. At 650, if there is another lighting cluster, steps 635-645 are repeated for the next lighting cluster.

Figure 7:
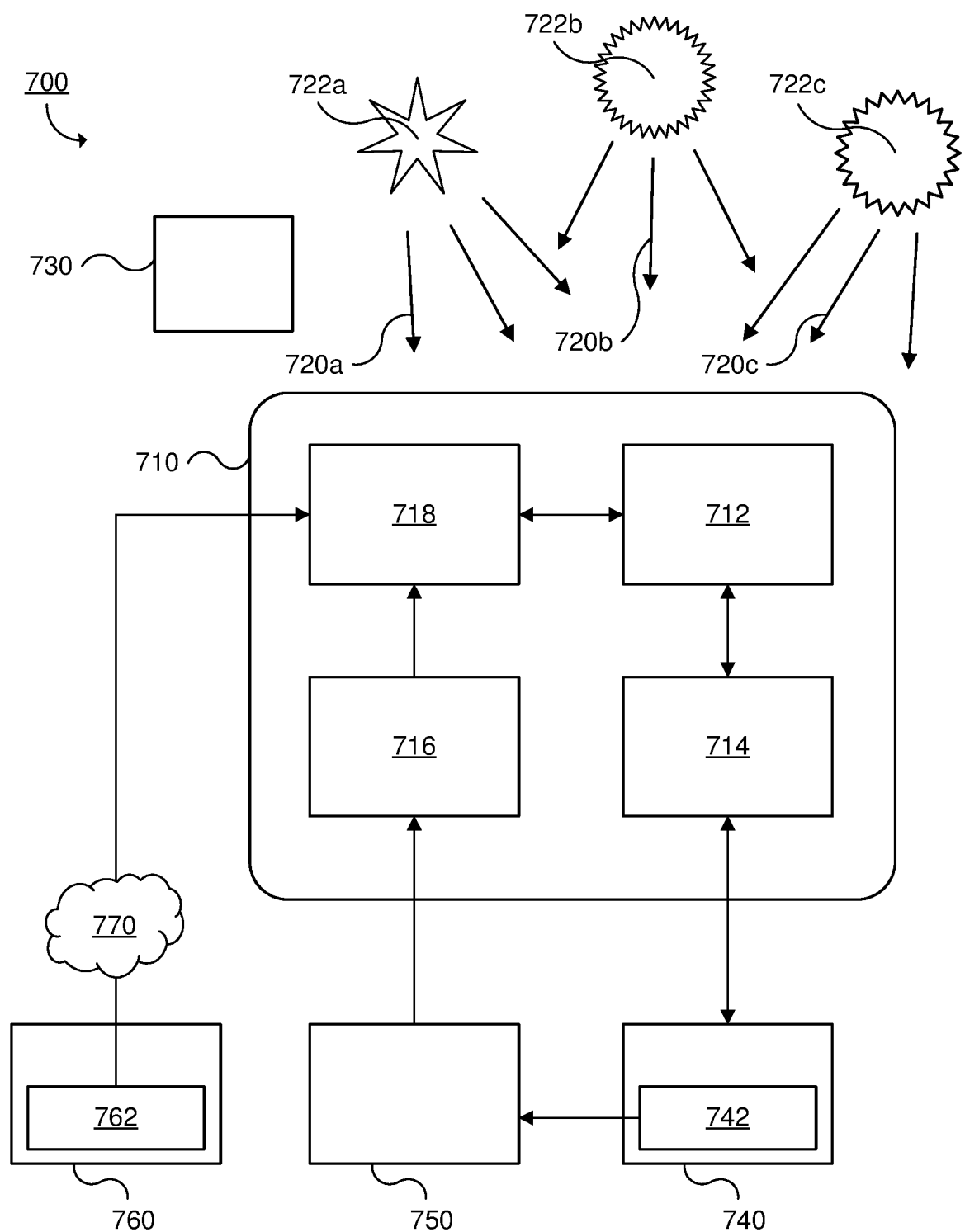
FIG. 7 illustrates an example of a sensor calibration system configured to perform a per-sensor calibration for use in combination with the generic transformation parameters produced by the ambient lighting characterization system in FIG. 4.

FIG. 7 illustrates an example of a sensor calibration system 700 configured to perform a per-sensor calibration for use in combination with the sets of generic transformation parameters produced by the ambient lighting characterization system 400 in FIG. 4. In FIG. 7, an electronic device 710, which may include various elements and features described for the electronic device 100 in FIGS. 1 and 2, is being used in combination with the sensor calibration system 700 to calculate a per-sensor calibration for a color sensing ambient light sensor 712 included in the electronic device 700. This calibration may be performed as part of a manufacturing process for the electronic device 100. Preferably an optical stack for the color sensing ambient light sensor 712 is substantially the same as the optical stacks for the reference sensors 422 used to collect color measurements for generating sets of generic transformation parameters used for the color sensing ambient light sensor 712, and active semiconductor elements of the color sensing ambient light sensor 712 have substantially similar spectral responses to their counterparts in the reference sensors 422.

The electronic device 710 also includes a measurement control module 714, with may operate and include features much as described for measurement control modules 424 in FIG. 4. The measurement control module 714 is configured to receive commands from a correction parameter calculation module 740 included in sensor calibration system 700 (although in some implementations, some or all of the correction parameter calculation module 740 may be included in the electronic device 710), control the color sensing ambient light sensor 712 according to the received commands (including, for example, setting operating parameters and/or initiating measurement operations), obtain sensor signals from the color sensing ambient light sensor 712, and provide the sensor signals to the correction parameter calculation module 740.

The sensor calibration system 700 includes one or more calibration lighting sources 722a, 772b, and 722c (also referred to as representative light sources, and collectively referred to as calibration lighting sources 722) that are selectively operated to produce respective first calibration ambient lighting 720a, second calibration ambient lighting 720b, and third calibration ambient lighting 720c (more generally referred to as calibration ambient lighting 720), each with a predetermined reference illuminance at the electronic device 710; for example, an illuminance that is substantially similar to the reference illuminance described in FIG. 4. The first calibration ambient lighting 720a corresponds to a first lighting cluster included in the lighting clusters identified by the characterization system 400, such as the first lighting cluster 510 in FIG. 5D. The second calibration ambient lighting 720*b* corresponds to a second lighting cluster included in the lighting clusters identified by the characterization system 400, such as the third lighting cluster 530 in FIG. 5E. The third calibration ambient lighting 720*c* corresponds to a third lighting cluster included in the lighting clusters identified by the characterization system 400, such as the fourth lighting cluster 540 in FIG. 5E. In some examples, the calibration ambient light 720 is substantially similar to an ambient lighting scenario used to calculate the stored sets of generic transformation parameters 472.

In some implementations, the number of different calibration ambient lighting 720 is equal to the number of lighting clusters. In some implementations, the calibration lighting sources 722 are selectively enabled and disabled to produce the various calibration ambient lighting 720). In other implementations, the calibration lighting sources 722 are continuously operated, allowing them to reach stable operating conditions, and the electronic device 710 is moved from one calibration lighting source 722 to another for calibrating the electronic device 710. In some examples, the sensor calibration system 700 may include a reference spectrometer 730, which allows periodic confirmation that the calibration ambient lighting 720 presents the desired spectral emission and illuminance.

The correction parameter calculator 740 is configured to collect one or more color measurements from the electronic device 710 indicating a response of the color sensing ambient light sensor 712 to a calibration ambient light 720 that the color sensing ambient light sensor 712 is exposed to, resulting in a sensed color measurement (which may be, for example, an average of multiple color measurements received from the electronic device 710 while exposed to a same calibration ambient light 720). In some examples, one or more scale factors may be applied to the sensed color measurement to compensate for differences in integration time, amplifier gain, and/or amplifier performance between the color sensing ambient light sensor 712 and the reference sensors 422 used to collect the stored color measurements 452. A set of sensor correction parameters for the color sensing ambient light sensor 712 is calculated based on a comparison between the sensed color measurement and a first reference color measurement. In some implementations, the first reference color measurement is calculated as an average of a plurality of stored color measurements 452 (which may selectively exclude outlier values) for the first lighting cluster at the reference illuminance for a plurality of ambient lighting scenarios associated with the first lighting cluster. In other implementations, the calibration ambient light 720 is substantially similar to a first ambient lighting scenario used to calculate the stored sets of generic transformation parameters 472, and the first reference color measurement is instead calculated as an average of a plurality of stored color measurements 452 (which may selectively exclude outlier values) for the first ambient lighting scenario at the reference illuminance. The first reference color measurement may be calculated in advance.

In some implementations, a set of sensor correction parameters is calculated by, for each color measurement component (for example, the four color measurement components $MC_1$, $MC_2$, $MC_3$, and $MC_4$), calculating a respective sensor correction parameter by dividing the reference color measurement component by the corresponding sensed color measurement component. For example, a set of sensor correction parameters $P_1$, $P_2$, $P_3$, and $P_4$ would be calculated from reference color measurement components $R_1$, $R_2$, $R_3$, and $R_4$ and sensed color measurement components $S_1$, $S_2$, $S_3$, and $S_4$ according to equations 4-7.

$$P_1 = R_1/S_1 \quad (4)$$

$$P_2 = R_2/S_2 \quad (5)$$

$$P_3 = R_3/S_3 \quad (6)$$

$$P_4 = R_4/S_4 \quad (7)$$

The sensor calibration system 700 includes a lighting source 722 for each of the lighting clusters identified by the characterization system 400, and a different set of sensor correction parameters is calculated for each lighting cluster. In some implementations, lighting sources for only a portion of the lighting clusters are used by the sensor calibration system 700.

In some implementations, the sensor calibration system 700 is configured to automatically determine that the color sensing ambient light sensor 712 is not operating correctly based on one or more sensor correction parameters being outside of a first expected range and/or one or more sensed color measurement components being outside of a second expected range. For example, an expected range for a sensed color measurement component may be a specified percentage above and below a corresponding reference color measurement component. In response to such a determination that the color sensing ambient light sensor is not operating correctly, an indication that the color sensing ambient light sensor is not operating correctly is transmitted to another system.

The correction parameter calculator 740 may be configured to store the sensor correction parameters in association with the color sensing ambient light sensor 712, as well as provide the stored sets of sensor correction parameters 742 in response to requests from other modules and/or systems. The correction parameter calculator 740 may be configured to store the sensed color measurement(s) obtained for the color sensing ambient light sensor 712 in association with the color sensing ambient light sensor 712, to facilitate recalculating the stored sets of sensor correction parameters 742 without involvement of the electronic device 710.

The sensor calibration system 700 includes a calibration data delivery module 750, which is configured to provide the stored sets of sensor correction parameters 742, the stored cluster parameters 462, and the stored sets of generic transformation parameters 472 to the electronic device 710 for storage as sensor calibration data 716 in the electronic device 710. In some implementations, the sensor calibration system 700 also includes an operating code delivery module 760, which is configured to provide program instructions 762 to the electronic device 710 (in some implementations, they may be provided via a network 770) for storage as operational program instructions 718 in the electronic device 710. When executed by the electronic device 710, the operational program instructions 718 configure the electronic device 710 to configure and control the color sensing ambient light sensor 712, and apply the stored sensor calibration data 716 to color measurements obtained from the color sensing ambient light sensor 712 to produce calibrated color values.

Although FIG. 7 only illustrates use of a single representative light source 722 for performing sensor-specific calibration, in other implementations, multiple representative light sources for different lighting clusters may be used to perform sensor-specific calibration.

Figure 8:
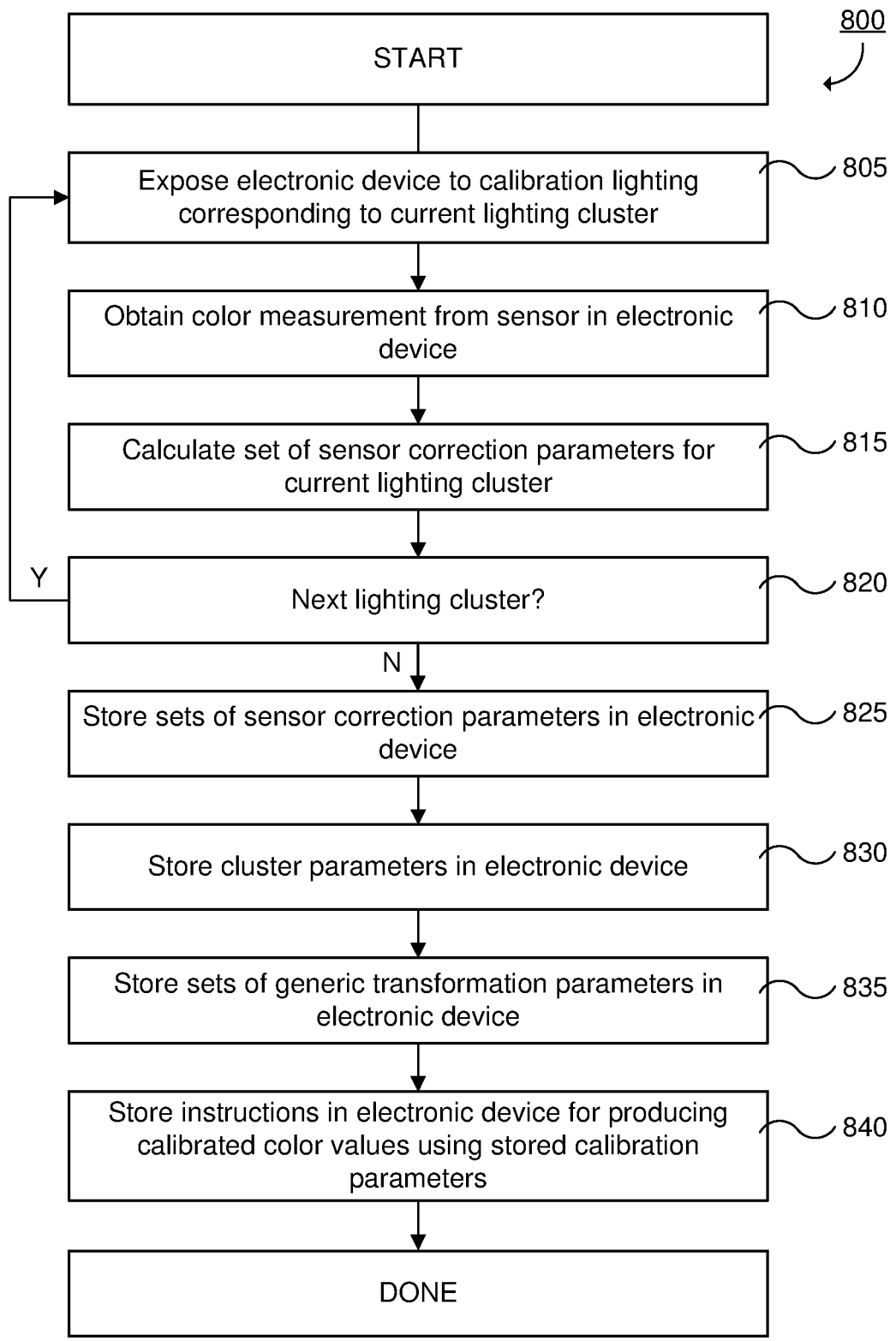
FIG. 8 illustrates an example process for use of the sensor calibration system in FIG. 7.

FIG. 8 illustrates an example process 800 for use of the sensor calibration system 700 in FIG. 7. applying the various techniques described above. It is noted that other processes, or variations of the process 800, may instead be applied. At 805, the electronic device 710 is exposed to calibration lighting 720 corresponding to a current lighting cluster. At 810, a color measurement is obtained from the color sensing ambient light sensor 712 included in the electronic device 710. At 815, the electronic device 710 calculates a set of sensor correction parameters for the current lighting cluster. At 820, if there is another lighting cluster, steps 805-815 are repeated for the next lighting cluster. At 825, the sets of sensor correction parameters calculated at 815 are stored in the electronic device 710. At 830, the cluster parameters are stored in the electronic device 710. At 835, the sets of generic transformation parameters are stored in the electronic device 710. At 840, instructions are stored in the electronic device 710 for producing calibrated color values from color measurements obtained from the ambient light sensor 712, using the calibration parameters stored in the electronic device 710 at 825, 830, and 835.

Figure 9:
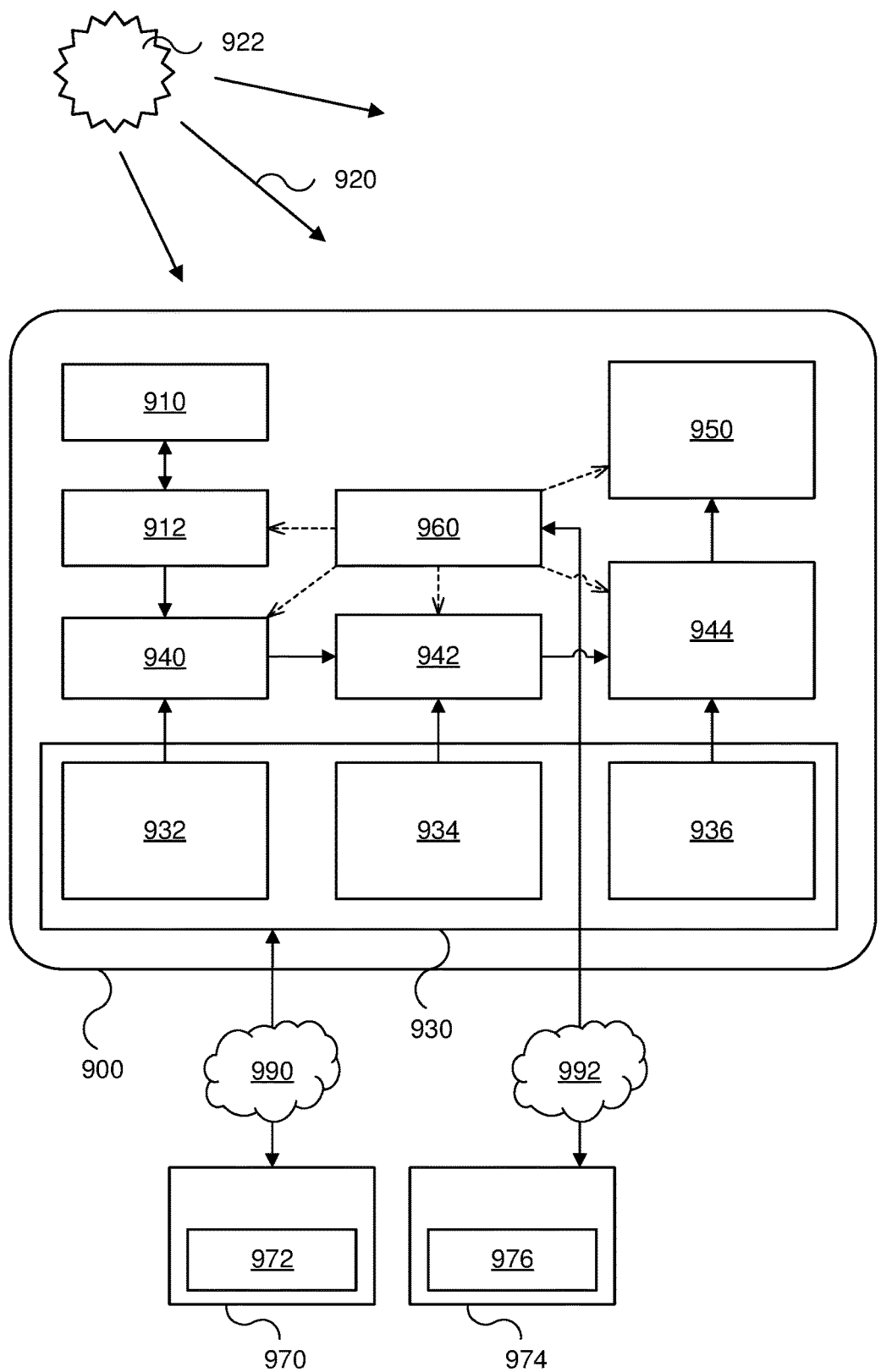
FIG. 9 illustrates an example of a calibrated electronic device in ordinary operation, for which a per-sensor calibration has been performed by the sensor calibration system in FIG. 7.

FIG. 9 illustrates an example of a calibrated electronic device 900 in ordinary operation, for which a per-sensor calibration has been performed by the sensor calibration system 700 in FIG. 7, much as described for electronic system 710. The calibrated electronic device 900 may operate and include various features as described for electronic devices 110 and 710. The calibrated electronic device 900 includes a color sensing ambient light sensor 910 that is substantially the same as the color sensing ambient light sensor 712. The calibrated electronic device 900 also includes a sensor control module 912 that is configured to control color sensing ambient light sensor 910 (including, for example, setting operating parameters and/or initiating measurement operations), obtain color measurements for ambient light 920 (which may be produced, at least in part, by a light source 922) in a vicinity of the calibrated electronic device 900 from the color sensing ambient light sensor 910, and provide the color measurements to a correction parameter application module 940 included in the calibrated electronic device 900.

Much as described for the sensor calibration data 716 in FIG. 7, the calibrated electronic device 900 stores sensor calibration data 930, which includes cluster parameters 932 (such as the stored cluster parameters 462 in FIG. 4), sets of sensor correction parameters 934 (such as the stored sets of sensor correction parameters 742 in FIG. 7), and sets of generic transformation parameters 936 (such as the stored sets of generic transformation parameters 472 in FIG. 4). Much as described in FIG. 7, the sensor calibration system 700 may provide the sensor calibration data 930 to be stored by the calibrated electronic device 900 during a factory sensor calibration procedure.

In some implementations, the calibrated electronic device 900 is configured to receive updates for the sensor calibration data 930 from a calibration data delivery system 970 via a network 990, such as the Internet. The calibration data delivery system 970 is configured to respond to requests for sensor calibration data and respond with items of sensor calibration data obtained from a calibration data storage 972. In addition to obtaining updated sensor calibration data, the calibrated electronic device 900 may also make use of the calibration data delivery system 970 to restore the sensor calibration data 930 in an event in which the sensor calibration data 930 is corrupted. In some examples, updates for the sensor calibration data 930 may instead be delivered as part of a software update including assets for other software features; for example, such software updates may be received from an operating code delivery system 974 configured to provide updates to operational program instructions 960 for the calibrated electronic device 900.

The calibrated electronic device 900 includes a series of modules used to implement per-sensor calibration for color values obtained based on color measurements performed by the color sensing ambient light sensor 910, the modules including a cluster selection module 940, a correction parameter application module 942, and a generic transformation module 944. The cluster selection module 940 is configured to receive, via the sensor control module 912, a color measurement produced by the color sensing ambient light sensor 910, and select, based on the cluster parameters 932, a corresponding ambient lighting cluster. The selection process depends in part on the algorithm used to apply the cluster parameters 932; for example, for lighting clusters identified using k-means, identifying the lighting cluster corresponding to a color measurement involves identifying which of multiple cluster centroids has the shortest Euclidean distance to the color measurement.

The correction parameter application module 942 is configured to select a set of the sensor correction parameters 934 that corresponds to the ambient lighting cluster, and to apply the selected set of sensor correction parameters 934 to the color measurement to get a corrected color measurement. For example, corrected color measurement components $C_1$, $C_2$, $C_3$, and $C_4$ would be calculated from measured color measurement components $M_1$, $M_2$, $M_3$, and $M_4$ and the set of sensor correction parameters $P_1$, $P_2$, $P_3$, and $P_4$ for the selected lighting cluster according to equations 8-11.

$$C_1 = M_1 \cdot P_1 \qquad (8)$$

$$C_2 = M_2 \cdot P_2 \qquad (9)$$

$$C_3 = M_3 \cdot P_3 \qquad (10)$$

$$C_4 = M_4 \cdot P_4 \qquad (11)$$

The generic transformation module 944 is configured to obtain a set of the generic transformation parameters 936 corresponding to the lighting cluster selected by the cluster selection module 940, and applying the obtained set of generic transformation parameters 936 to the corrected color measurement generated by the correction parameter application module 942 to obtain a calibrated color value (which may be in the form of CIE 1931 XYZ tristimulus values, for example). As an example, where a matrix-based approach for such calculations is employed, as described in FIG. 4, a calibrated tristimulus color value $C_{cal}$ is calculated (arranged as a 3×1 matrix) according to equation 12.

$$C_{cal} = P_{cluster} \cdot C_{corr} \qquad (12)$$

$P_{cluster}$ is the 3×4 matrix generic parameter matrix described in FIG. 4 for the selected lighting cluster, and $C_{corr}$ is the corrected color measurement generated by the correction parameter application module 942 (arranged as a 4×1 matrix).

The calibrated electronic device 900 includes a color processing module 950, which is configured to receive the calibrated color value generated by the generic transformation module 944 and make use of the calibrated color value; for example, by adjusting a color cast for an image presented on a display device according to the calibrated color value.

The calibrated electronic device 900 includes operational program instructions 960 which, when executed by the calibrated electronic device 900, cause the calibrated electronic device 900 to configure the calibrated electronic device 900 to implement the various modules 912, 940, 942, 944, and 950 described above.

Figure 10:
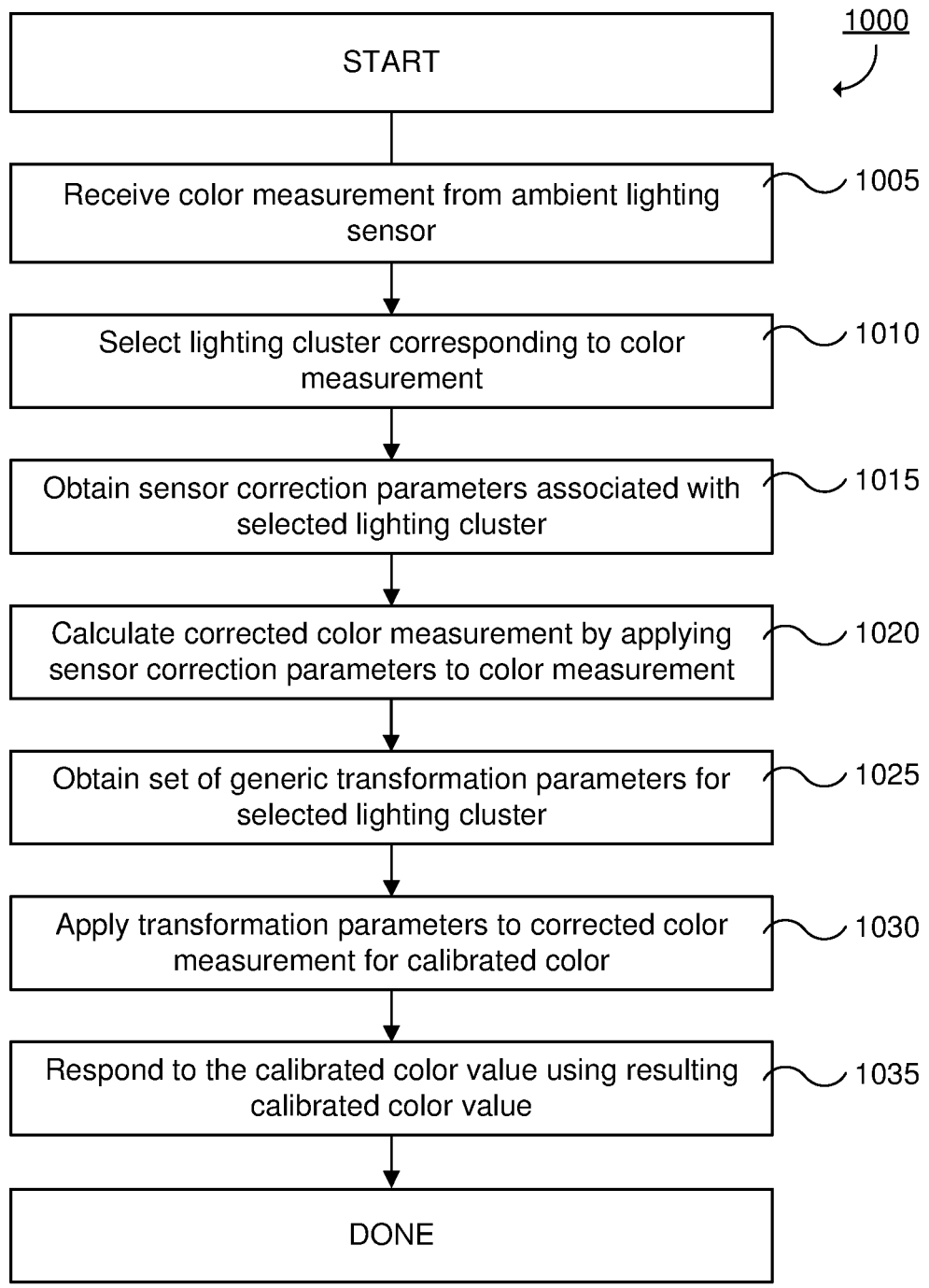
FIG. 10 illustrates an example process for generating calibrated color values with the calibrated electronic device in FIG. 9.

FIG. 10 illustrates an example process for generating calibrated color values with the calibrated electronic device 900 in FIG. 9, applying the various techniques described above. It is noted that other processes, or variations of the process 1000, may instead be applied. At 1050, the calibrated electronic device 900 receives a color measurement from an ambient light sensor 910 included in the calibrated electronic device 900. At 1010, the calibrated electronic device 900 selects a lighting cluster corresponding to the received color measurement, using cluster parameters stored in the calibrated electronic device 900. At 1015, the calibrated electronic device 900 obtains a stored set of sensor correction parameters associated with the lighting cluster selected at 1010. At 1020, the calibrated electronic device 900 calculates a corrected color measurement by applying the sensor correction parameters obtained at 1015 to the color measurement received at 1005. At 1025, the calibrated electronic device 900 obtains a stored set of generic transformation parameters associated with the lighting cluster selected at 1010. At 1030, the calibrated electronic device 900 calculates a calibrated color value by applying the set of generic transformation parameters obtained at 1025 to the corrected color measurement calculated at 1020. At 1035, the calibrated electronic device 900 responds to the calibrated color value using the resulting calibrated color value, such as, but not limited to, adjusting a color cast of an image presented via a display device.

The examples of systems and modules for providing per-sensor calibration for color sensing ambient light sensors, according to the disclosure, are presented herein for illustration of the disclosure and its benefits. Such examples of use should not be construed to be limitations on the logical process embodiments of the disclosure, nor should variations of user interface methods from those described herein be considered outside the scope of the present disclosure. Certain embodiments are described herein as including modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 11:
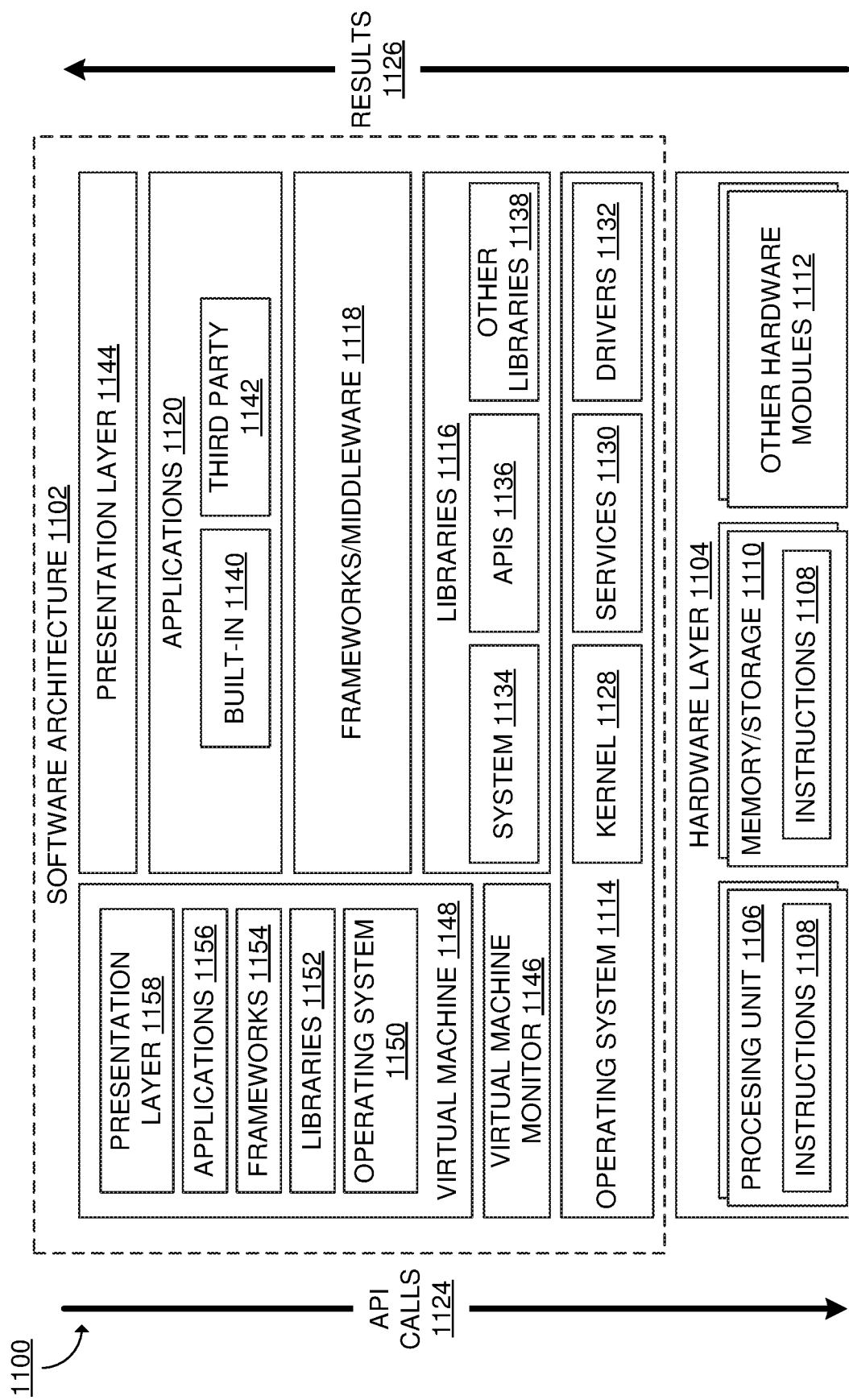
FIG. 11 is a block diagram illustrating an example software architecture, various portions of which may be used in conjunction with various hardware architectures herein described.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware such as a machine 1200 of FIG. 12 that includes, among other things, processors 1210, memory 1230, and input/output (I/O) components 1250. A representative hardware layer 1104 is illustrated and can represent, for example, the machine 1200 of FIG. 12. The representative hardware layer 1104 includes a processing unit 1106 and associated executable instructions 1108. The executable instructions 1108 represent executable instructions of the software architecture 1102, including implementation of the methods, modules and so forth described herein. The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1144. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1140 and/or third-party applications 1142. Examples of built-in applications 1140 may include, but are not limited to, a contacts application, a browser application, a location application, a media application, a messaging application, and/or a game application. Third-party applications 1142 may include any applications developed by an entity other than the vendor of the particular platform. The applications 1120 may use functions available via OS 1114, libraries 1116, frameworks 1118, and presentation layer 1144 to create user interfaces to interact with users.

Some software architectures use virtual machines, as illustrated by a virtual machine 1148. The virtual machine 1148 provides an execution environment where applications/modules can execute as if they were executing on a hardware machine (such as the machine 1200 of FIG. 12, for example). The virtual machine 1148 may be hosted by a host OS (for example, OS 1114) or hypervisor, and may have a virtual machine monitor 1146 which manages operation of the virtual machine 1148 and interoperation with the host operating system. A software architecture, which may be different from software architecture 1102 outside of the virtual machine, executes within the virtual machine 1148 such as an OS 1120, libraries 1122, frameworks 1124, applications 1126, and/or a presentation layer 1128.

Figure 12:
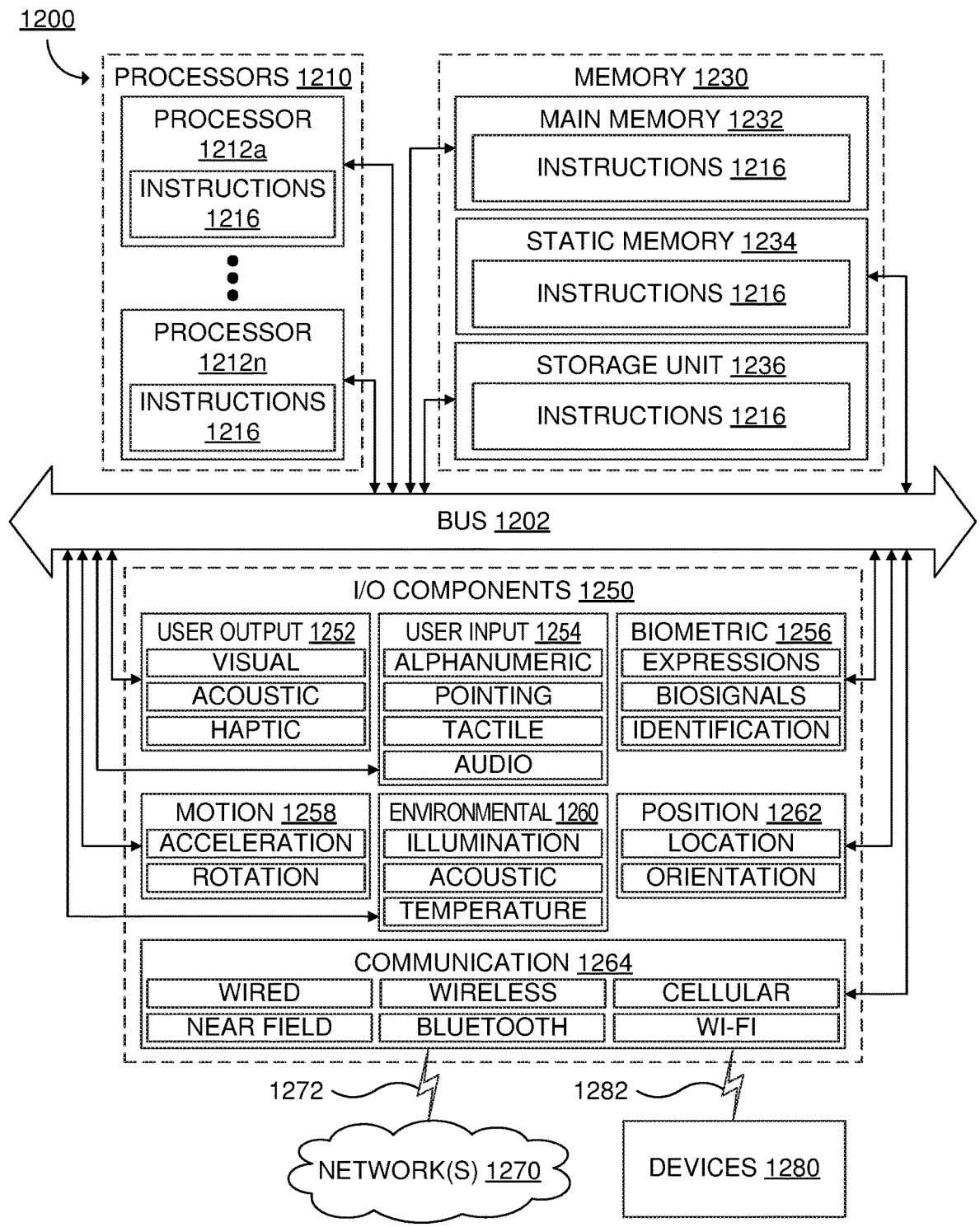
FIG. 12 is a block diagram illustrating components of an example machine configured to read instructions from a machine-readable medium.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" include a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212*a* to 1212*n* that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse, a touchpad, or another pointing instrument), tactile input components (for example, a physical button or a touch screen that provides location and/or force of touches or touch gestures), and/or audio input components (for example, a microphone) configured for receiving various user inputs, such as user commands and/or selections.

In some examples, the I/O components 1250 may include biometric components 1256, motion components 1258, environmental components 1260, and/or position components 1262, among a wide array of other components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facile-based identification). The motion components 1258 may include, for example, acceleration sensors (for example, an accelerometer) and rotation sensors (for example, a gyroscope). The environmental components 1260 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network(s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of color sensing ambient light sensor calibration, the method comprising:
    obtaining a first plurality of color measurements produced by each of a first plurality of color sensing ambient light sensors for each of a plurality of ambient lighting scenarios, wherein each color measurement includes a plurality of color measurement components indicating an amount of ambient light measured by a respective one of a plurality of light detectors having substantially different spectral response profiles;
    automatically clustering the first plurality of color measurements into a first plurality of lighting clusters based on the color measurement components included in the first plurality of color measurements;
    storing cluster parameters effective for automatically identifying which of the first plurality of lighting clusters is associated with a color measurement obtained from a color sensing ambient light sensor; and
    for each lighting cluster included in the first plurality of lighting clusters:
        based on a portion of the plurality of color measurements associated with the lighting cluster, automatically calculating a set of generic transformation parameters for automatically converting a color measurement obtained from a color sensing ambient light sensor to a corresponding calibrated color value, and
        storing the set of generic transformation parameters in association with the lighting cluster.

2. The method of claim 1, wherein each of the plurality of ambient lighting scenarios has a substantially different spectral emission profile.

3. The method of claim 1, wherein the first plurality of color measurements includes, for each of the plurality of ambient lighting scenarios, color measurements for substantially different illuminances.

4. The method of claim 3, wherein the color measurements used for calculating the sets of generic transformation parameters are for substantially similar illuminances.

5. The method of claim 1, further comprising:
    obtaining a second plurality of color measurements for one or more additional color sensing ambient light sensors not included in the first plurality of color sensing ambient light sensors; and
    identifying the one or more additional color sensing ambient light sensors as outlier sensors based on one or more of the first plurality of color measurements and one or more of the plurality of color measurements.

6. The method of claim 1, further comprising, for each lighting cluster included in two or more of the first plurality of lighting clusters:
calculating a reference color measurement based on color measurements
storing the reference color measurement in association with the lighting cluster.

7. The method of claim 1, further comprising:
calculating, for each color measurement included in the plurality of color measurements, a respective ratio of a first color measurement component of the color measurement to a second color measurement component of the color measurement,
wherein the clustering is determined using the ratios as a dimension.

8. The method of claim 1, wherein the clustering comprises:
automatically clustering the first plurality of color measurements into a second plurality of lighting clusters based on the color measurement components included in the first plurality of color measurements, wherein at least one of the second plurality of lighting clusters is included in the first plurality of lighting clusters; and
automatically clustering the first plurality of color measurements associated with one of the second plurality of lighting clusters into a third plurality of lighting clusters based on a dimension not used for clustering the first plurality of color measurements into the second plurality of lighting clusters, wherein each of the third plurality of lighting clusters is included in the first plurality of lighting clusters.

9. The method of claim 1, further comprising:
associating a subset of the plurality of ambient lighting scenarios with a first lighting cluster included in the first plurality of lighting clusters based on the first plurality of color measurements that are included in the first lighting cluster;
calculating a reference color measurement by calculating average color measurement component values for the first color measurements for one or more of the subset of ambient lighting scenarios for illuminances substantially similar to a reference illuminance; and
storing the reference color measurement in association with the first lighting cluster.

10. A method for calibrating a color sensing ambient light sensor included in an electronic device, the method comprising:
exposing the color sensing ambient light sensor to a first calibration ambient lighting corresponding to a first lighting cluster;
obtaining a first color measurement produced by the color sensing ambient light sensor in response to being exposed to the first calibration ambient lighting, wherein the first color measurement includes a plurality of color measurement components indicating an amount of light detected by a respective one of a plurality of light detectors having substantially different spectral response profiles;
calculating a first set of sensor correction parameters specific to the color sensing ambient light sensor based on a comparison between the first color measurement and a first reference color measurement associated with the first lighting cluster;
storing the first set of sensor correction parameters in association with the first lighting cluster in a tangible machine-readable storage medium included in the electronic device;
storing in the tangible machine-readable storage medium, in association with the first lighting cluster, a first set of generic transformation parameters for automatically converting a color measurement obtained from the color sensing ambient light sensor into a corresponding calibrated color value; and
storing in the tangible machine-readable storage medium instructions which, when executed by the electronic device, cause the electronic device to:
receive a first color measurement from the color sensing ambient light sensor; and
calculate a calibrated color value based on the first color measurement using the first set of generic transformation parameters.

11. The method of claim 10, further comprising:
storing in the tangible machine-readable storage medium cluster parameters effective for automatically identifying which of a plurality of lighting clusters is associated with a color measurement obtained for a color sensing ambient light sensor, the plurality of lighting clusters including the first lighting cluster; and
storing in the tangible machine-readable storage medium instructions to calculate the calibrated color value based on the first color measurement using the selected set of generic transformation parameters which, when executed by the electronic device, cause the electronic device to:
automatically identify, using the stored cluster parameters, which of the plurality of lighting clusters is associated with the first color measurement,
calculate a corrected color measurement by converting the first color measurement using the stored first set of sensor correction parameters,
select, where the first lighting cluster is identified as being associated with the first color measurement, the first set of generic transformation parameters from a plurality of sets of generic transformation parameters stored in the tangible machine-readable storage medium, and
calculate the calibrated color value by converting the corrected color measurement using the selected set of generic transformation parameters.

12. The method of claim 10, further comprising:
exposing the color sensing ambient light sensor to a second calibration ambient lighting corresponding to a second lighting cluster different than the first lighting cluster;
obtaining a second color measurement produced by the color sensing ambient light sensor in response to being exposed to the second calibration ambient lighting;
calculating a set of second sensor correction parameters specific to the color sensing ambient light sensor based on a comparison between the second color measurement and a second reference color measurement associated with the second lighting cluster; and
storing the second set of sensor correction parameters in association with the second lighting cluster in the tangible machine-readable storage medium.

13. The method of claim 10, further comprising:
automatically determining that the color sensing ambient light sensor is not operating correctly based on one or more values of the first set of sensor correction parameters being outside of an expected range; and transmitting, in response to the determination that the color sensing ambient light sensor is not operating correctly, an indication that the color sensing ambient light sensor is not operating correctly.

14. An electronic device adapted to determine calibrated color values for ambient lighting encountered by electronic device, the electronic device comprising:
- a color sensing ambient light sensor including a plurality of light detectors having substantially different spectral sensitivity profiles;
- one or more tangible machine readable media in which are stored:
  - cluster parameters effective for automatically identifying which of a first plurality of lighting clusters is associated with a color measurement obtained for the color sensing ambient light sensor,
  - one or more sets of sensor correction parameters, specific to the color sensing ambient light sensor and including a first set of sensor correction parameters for a first lighting cluster included in the first plurality of lighting clusters,
  - a plurality of sets of generic transform parameters for automatically converting a color measurement obtained from a color sensing ambient light sensor into a corresponding calibrated color value, including a different set of generic transform parameters associated with each of the first plurality of lighting clusters,
  - instructions which, when executed by the electronic device, cause the electronic device to:
    - receive a first color measurement from the color sensing ambient light sensor,
    - automatically identify, using the stored cluster parameters, which of the first plurality of lighting clusters is associated with the first color measurement,
    - calculate a corrected color measurement by converting the first color measurement using one of the stored sets of sensor correction parameters,
    - select, from the plurality of sets of generic transformation parameters stored in the tangible machine-readable storage medium, a first set of generic transformation parameters associated with the identified lighting cluster, and
    - calculate a calibrated color value by converting the corrected color measurement using the selected first set of generic transformation parameters.

15. The electronic device of claim 14, wherein the calibrated color value is a CIE 1931 XYZ tristimulus value.

16. The electronic device of claim 14, wherein the instructions for automatically identifying which of the plurality of lighting clusters is associated with the first color measurement, when executed by the electronic device, cause the electronic device to:
- automatically identify, using the stored cluster parameters, which of a second plurality of lighting clusters is associated with the first color measurement, wherein the second plurality of lighting clusters includes a first lighting cluster included in the first plurality of lighting clusters and a second lighting cluster not included in the first plurality of lighting clusters; and
- in response to identifying that the second lighting cluster is associated with the first color measurement, automatically identify, using the stored cluster parameters, which of a third plurality of lighting clusters is associated with the first color measurement, wherein each of the third plurality of lighting clusters is included in the first plurality of lighting clusters.

17. The electronic device of claim 14, wherein the instructions further cause the electronic device to:
- calculate a ratio of a first color measurement component of the first color measurement to a second color measurement component of the first color measurement; and
- use the ratio for the automatic identification of which of the first plurality of lighting clusters is associated with the first color measurement.

* * * * *